United States Patent
Browne et al.

(10) Patent No.: US 11,671,382 B2
(45) Date of Patent: Jun. 6, 2023

(54) TECHNOLOGIES FOR COORDINATING ACCESS TO DATA PACKETS IN A MEMORY

(71) Applicant: Intel Corporation, Santa Clara, CA (US)

(72) Inventors: John J. Browne, Limerick (IE); Seán Harte, Limerick (IE); Tomasz Kantecki, Ennis (IE); Pierre Laurent, Quin (IE); Chris MacNamara, Limerick (IE)

(73) Assignee: Intel Corporation, Santa Clara, CA (US)

( * ) Notice: Subject to any disclaimer, the term of this patent is extended or adjusted under 35 U.S.C. 154(b) by 447 days.

(21) Appl. No.: 15/185,864

(22) Filed: Jun. 17, 2016

(65) Prior Publication Data
US 2017/0366477 A1 Dec. 21, 2017

(51) Int. Cl.
*H04N 21/443* (2011.01)
*H04L 49/9057* (2022.01)
(Continued)

(52) U.S. Cl.
CPC ........ *H04L 49/9057* (2013.01); *H04L 1/0016* (2013.01); *H04L 49/102* (2013.01);
(Continued)

(58) Field of Classification Search
CPC ... H04L 69/00; H04L 49/9057; H04L 49/102; H04L 49/3063; H04L 29/0653;
(Continued)

(56) References Cited

U.S. PATENT DOCUMENTS 4,934,823 A * 6/1990 Okami ................... G06F 16/10
345/530
6,047,118 A * 4/2000 Sofman ............... H04Q 3/0075
398/9
(Continued)

FOREIGN PATENT DOCUMENTS

| CN | 101706742 B | * 11/2012 |
| EP | 0775958 A1 | 5/1997 |
| WO | 2014113063 A1 | 7/2014 |

OTHER PUBLICATIONS

International search report for PCT application No. PCT/2017/033279, dated Aug. 17, 2017 (3 pages).
(Continued)

*Primary Examiner* — Salvador E Rivas
(74) *Attorney, Agent, or Firm* — Compass IP Law PC

(57) ABSTRACT

Technologies for coordinating access to packets include a network device. The network device is to establish a ring in a memory of the network device. The ring includes a plurality of slots. The network device is also to allocate cores to each of an input stage, an output stage, and a worker stage. The worker stage is to process data in a data packet with an associated worker function. The network device is also to add, with the input stage, an entry to a slot in the ring representative of a data packet received with a network interface controller of the network device, access, with the worker stage, the entry in the ring to process at least a portion of the data packet, and provide, with the output stage, the processed data packet to the network interface controller for transmission.

26 Claims, 11 Drawing Sheets

(51) Int. Cl.
   *H04N 21/426* (2011.01)
   *H04L 49/103* (2022.01)
   *H04L 1/00* (2006.01)
   *H04L 49/102* (2022.01)
   *H04L 49/00* (2022.01)
   *H04L 49/9005* (2022.01)
   *H04N 21/232* (2011.01)

(52) U.S. Cl.
   CPC ........ *H04L 49/103* (2013.01); *H04L 49/3063* (2013.01); *H04N 21/42692* (2013.01); *H04N 21/4435* (2013.01); *H04L 1/002* (2013.01); *H04L 49/9005* (2013.01); *H04N 21/2326* (2013.01)

(58) Field of Classification Search
   CPC ... H04L 49/25–309; H04L 49/90–9094; H04L 69/22; H04L 47/2483; H04L 49/103; H04L 49/9005; H04L 1/0016; H04L 1/002; H04N 21/4435; H04N 21/42692; H04N 21/2326
   See application file for complete search history.

(56) References Cited

U.S. PATENT DOCUMENTS

| | | | | |
|---|---|---|---|---|
| 7,313,098 B2* | 12/2007 | Bearden | .................. | H04L 1/205 370/252 |
| 7,571,216 B1* | 8/2009 | McRae | .................. | G06F 13/28 709/213 |
| 7,671,216 B2 | 3/2010 | Sattigeri et al. | | |
| 8,550,095 B2* | 10/2013 | Glenn, Jr | .................. | A61Q 5/08 132/270 |
| 10,341,264 B2 | 7/2019 | Browne et al. | | |
| 10,411,985 B1* | 9/2019 | Miller | .................. | G06F 11/301 |
| 2002/0199089 A1* | 12/2002 | Burns | .................. | G06F 9/3851 712/228 |
| 2006/0045120 A1* | 3/2006 | Mattina | .................. | H04L 47/10 370/460 |
| 2006/0174251 A1 | 8/2006 | Pope et al. | | |
| 2008/0028103 A1 | 1/2008 | Schlansker et al. | | |
| 2008/0056124 A1* | 3/2008 | Nanda | .................. | H04L 29/06 370/229 |
| 2008/0151765 A1* | 6/2008 | Cheruvathery | .................. | H04J 3/0632 370/252 |
| 2008/0209420 A1 | 8/2008 | Matsuo | | |
| 2012/0191800 A1 | 7/2012 | Michels et al. | | |
| 2013/0054938 A1 | 2/2013 | Giacomoni et al. | | |
| 2013/0173806 A1* | 7/2013 | Newton | .................. | H04L 67/1008 709/226 |
| 2013/0179753 A1* | 7/2013 | Flynn | .................. | G06F 12/0253 714/773 |
| 2013/0232137 A1* | 9/2013 | Knott | .................. | H04L 63/1416 707/722 |
| 2014/0032695 A1 | 1/2014 | Michels et al. | | |
| 2014/0143366 A1 | 5/2014 | Thakkar | | |
| 2014/0149993 A1* | 5/2014 | Sandstrom | .................. | G06F 9/5038 718/108 |
| 2014/0280999 A1* | 9/2014 | Collison | .................. | H04W 12/68 709/230 |
| 2015/0172193 A1 | 6/2015 | Sinha et al. | | |
| 2016/0224373 A1* | 8/2016 | Harris | .................. | G06F 9/5027 |
| 2016/0246472 A1* | 8/2016 | Zhao | .................. | G06F 1/1694 |
| 2016/0357702 A1* | 12/2016 | Shamis | .................. | G06F 9/547 |
| 2017/0366477 A1* | 12/2017 | Browne | .................. | H04L 49/102 |
| 2019/0327190 A1* | 10/2019 | Browne | .................. | H04L 49/9042 |

OTHER PUBLICATIONS

Written opinion for PCT application No. PCT/2017/033279, dated Aug. 17, 2017 (7 pages).
International Preliminary Report on Patentability for PCT Patent Application No. PCT/US2017/035205, dated Jan. 1, 2019, 8 pages.
International Search Report and Written Opinion for PCT Patent Application No. PCT/US17/35205, dated Sep. 17, 2017, 10 pages.
First Office Action for U.S. Appl. No. 16/460,424, dated Jun. 1, 2021, 19 pages.
German Examination Report for Patent Application No. 112017003294, dated Jun. 21, 2021, 8 pages.

\* cited by examiner

TECHNOLOGIES FOR COORDINATING ACCESS TO DATA PACKETS IN A MEMORY

BACKGROUND

Systems for enabling multiple process stages to operate on a set of data packets typically prepare queues, such as first in first out (FIFO) queues, that store pointers to the data packets and provide the individual queues to each stage. The stages are typically assigned to various cores of a processor of a system. Each queue is independent, meaning each queue is allocated its own set of memory, and each stage operates on its own copy of the queue. This may cause a performance decrease if a pipeline includes stages that cannot safely operate in parallel, as these queues cannot easily be used to pass packets to dependent stages. This approach can cause packets to go out of arrival order, since multiple packets are operated on in parallel and can have different completion times for each packet. Loss of arrival order information can force additional processing to re-order the packets. Further, in such systems, the dependent stage polls the multiple queues, waiting for the same packet pointer to arrive on both queues before proceeding. The additional buffering of distinct queues between stages in a pipeline and repeated polling by dependent stages may increase the latency in processing data packets.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
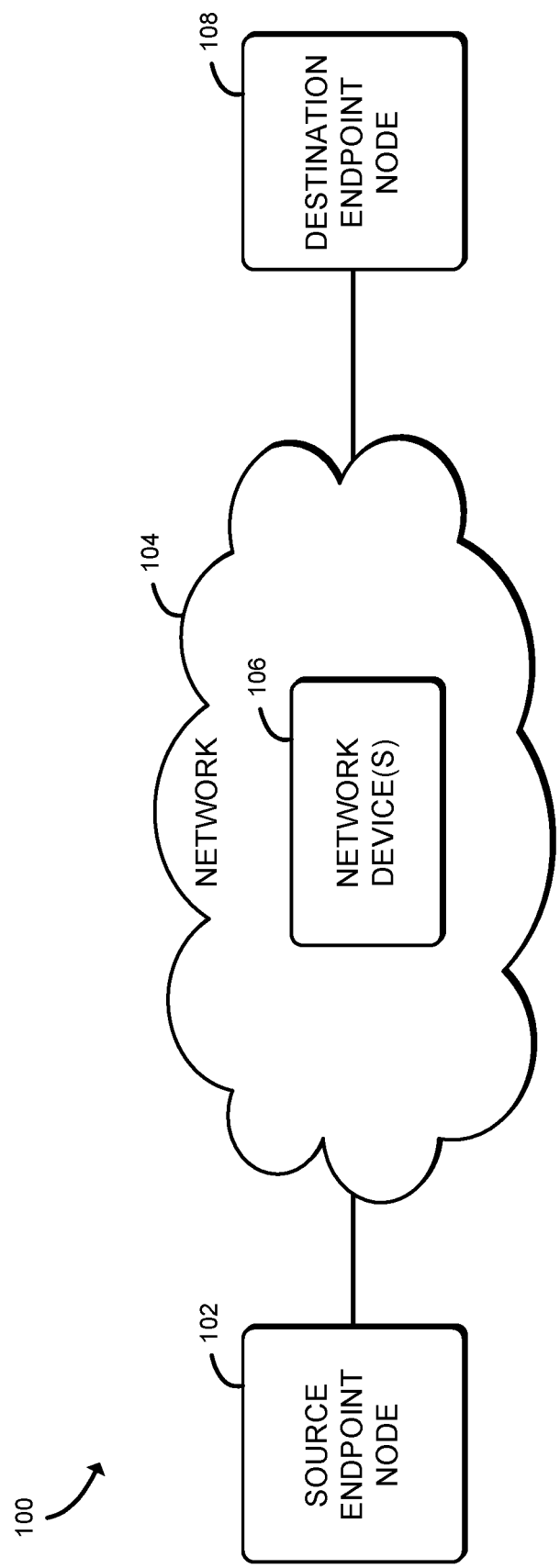
FIG. 1 is a simplified block diagram of at least one embodiment of a system that includes a network device for coordinating access of stages to data packets held in memory.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims. References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for coordinating access of stages to data packets includes a source endpoint node 102 and a destination endpoint node 108 in communication over a network 104 via one or more network devices 106. In use, the network device 106 facilitates the transmission of network packets (e.g., based on workload type, flow information, etc.) between the source endpoint node 102 and the destination endpoint node 108 over the network 104. As described in more detail herein, the illustrative network device 106 utilizes a shared ring in memory and allocates cores of one or more processors of the network device 106 to various stages of a processing pipeline. In the illustrative embodiment, the stages include an input stage, one or more worker stages, and an output stage. The input stage receives data packets from a network interface controller (NIC), which may also be referred to as a host fabric interface (HFI), of the network device 106 (i.e., data packets from the source endpoint node 102) and add entries to the ring. Each entry includes metadata defining properties of the data packet, and a pointer to the actual data packet in memory. The worker stages access the entries in the ring and perform operations on the metadata and data packets, such as compressing, decompressing, encrypting, or decrypting packet data and/or adding, removing, or modifying headers. The worker stages additionally may modify the metadata to indicate a status of the entry, such as whether a particular stage has completed processing of the data packet and/or whether the data packet is ready for transmission. The output stage identifies entries in the ring having metadata that indicates that the corresponding data packet is ready for transmission, and provides those data packets to the NIC for transmission (i.e., to the destination endpoint node 108). By coordinating access by the stages to the data packet using the ring, the network device 106 reduces the memory overhead for processing packets with different stages, and reduces latency.

The source endpoint node 102 may be embodied as any type of computation or computing device capable of performing the functions described herein, including, without limitation, a computer, a desktop computer, a smartphone, a workstation, a laptop computer, a notebook computer, a tablet computer, a mobile computing device, a wearable computing device, a network appliance, a web appliance, a distributed computing system, a processor-based system, and/or a consumer electronic device. Similarly, the destination endpoint node 108 may be embodied as any type of computation or computing device capable of performing the functions described herein, including, without limitation, a computer, a desktop computer, a smartphone, a workstation, a laptop computer, a notebook computer, a tablet computer, a mobile computing device, a wearable computing device, a network appliance, a web appliance, a distributed computing system, a processor-based system, and/or a consumer electronic device. Each of the source endpoint node 102 and the destination endpoint node 108 may include components commonly found in a computing device such as a processor, memory, input/output subsystem, data storage, communication circuitry, etc.

The network 104 may be embodied as any type of wired or wireless communication network, including cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), telephony networks, local area networks (LANs) or wide area networks (WANs), global networks (e.g., the Internet), or any combination thereof. Additionally, the network 104 may include any number of network devices 106 as needed to facilitate communication between the source endpoint node 102 and the destination endpoint node 108.

Figure 2:
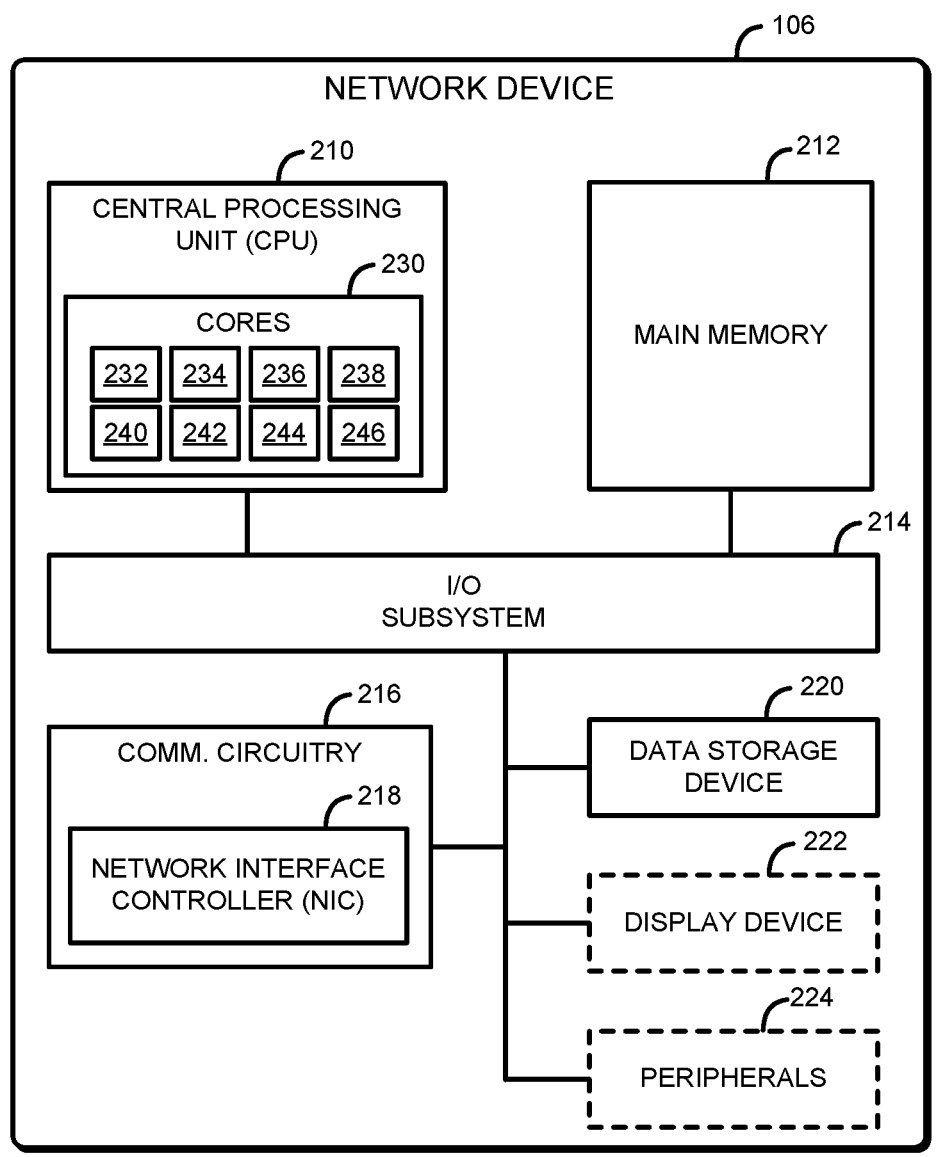
FIG. 2 is a simplified block diagram of at least one embodiment of a network device of the system of FIG. 1.

Each network device 106 may be embodied as any type of computing device capable of facilitating wired and/or wireless network communications between the source endpoint node 102 and the destination endpoint node 108. For example, the network devices 106 may be embodied as a server (e.g., stand-alone, rack-mounted, blade, etc.), a router, a switch, a network hub, an access point, a storage device, a compute device, a multiprocessor system, a network appliance (e.g., physical or virtual), a computer, a desktop computer, a smartphone, a workstation, a laptop computer, a notebook computer, a tablet computer, a mobile computing device, or any other computing device capable of processing network packets. As shown in FIG. 2, an illustrative network device 106 includes a central processing unit (CPU) 210, a main memory 212, an input/output (I/O) subsystem 214, and communication circuitry 216. Of course, in other embodiments, the network device 106 may include other or additional components, such as those commonly found in a computer (e.g., data storage, display, etc.). Additionally, in some embodiments, one or more of the illustrative components may be incorporated in, or otherwise form a portion of, another component. For example, in some embodiments, the main memory 212, or portions thereof, may be incorporated in the CPU 210.

The CPU 210 may be embodied as any type of processor capable of performing the functions described herein. The CPU 210 may be embodied as a single or multi-core processor(s), a microcontroller, or other processor or processing/controlling circuit. In some embodiments, the CPU 210 may be embodied as, include, or be coupled to a field programmable gate array (FPGA), an application specific integrated circuit (ASIC), a graphics processing unit (GPU), reconfigurable hardware or hardware circuitry, or other specialized hardware to facilitate performance of the functions described herein. In the illustrative embodiment, the CPU 210 is embodied as a processor containing a set 230 of multiple cores 232, 234, 236, 238, 240, 242, 244, and 246. While eight cores are shown in FIG. 2, it should be understood that in other embodiments, the CPU 210 may contain a different number of cores. Similarly, the main memory 212 may be embodied as any type of volatile (e.g., dynamic random access memory (DRAM), etc.) or non-volatile memory or data storage capable of performing the functions described herein. In some embodiments, all or a portion of the main memory 112 may be integrated into the CPU 210. In operation, the main memory 212 may store various data and software used during operation of the network device 106 such as ring data, packet data, stage data, operating systems, applications, programs, libraries, and drivers.

The I/O subsystem 214 may be embodied as circuitry and/or components to facilitate input/output operations with the CPU 210, the main memory 212, and other components of the network device 106. For example, the I/O subsystem 214 may be embodied as, or otherwise include, memory controller hubs, input/output control hubs, integrated sensor hubs, firmware devices, communication links (i.e., point-to-point links, bus links, wires, cables, light guides, printed circuit board traces, etc.), and/or other components and subsystems to facilitate the input/output operations. In some embodiments, the I/O subsystem 214 may form a portion of a system-on-a-chip (SoC) and be incorporated, along with one or more of the CPU 210, the main memory 212, and other components of the network device 106, on a single integrated circuit chip.

The communication circuitry 216 may be embodied as any communication circuit, device, or collection thereof, capable of enabling communications over the network 104 between the network device 106 and the source endpoint node 102, another network device 106, and/or the destination endpoint node 108. The communication circuitry 216 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 216 includes a network interface controller (NIC) 218, which may also be referred to as a host fabric interface (HFI). The NIC 218 may be embodied as one or more add-in-boards, daughtercards, network interface cards, controller chips, chipsets, or other devices that may be used by the network device 106 to connect the source endpoint node 102, the destination endpoint node 108, and/or another network device 106. In some embodiments, the NIC 218 may be embodied as part of a system-on-a-chip (SoC) that includes one or more processors, or included on a multichip package that also contains one or more processors. In some embodiments, the NIC 218 may include a local processor (not shown) and/or a local memory (not shown) that are both local to the NIC 218. In such embodiments, the local processor of the NIC 218 may be capable of performing one or more of the functions of the CPU 210 described herein. Additionally or alternatively, in such embodiments, the local memory of the NIC 218 may be integrated into one or more components of the network device 106 at the board level, socket level, chip level, and/or other levels.

The network device 106 may additionally include a data storage device 220, which may be embodied as any type of device or devices configured for short-term or long-term storage of data such as, for example, memory devices and circuits, memory cards, hard disk drives, solid-state drives, or other data storage devices. The data storage device 220 may include a system partition that stores data and firmware code for the network device 106. The data storage device 220 may also include an operating system partition that stores data files and executables for an operating system of the network device 106.

Additionally, the network device 106 may include a display 222. The display 222 may be embodied as, or otherwise use, any suitable display technology including, for example, a liquid crystal display (LCD), a light emitting diode (LED) display, a cathode ray tube (CRT) display, a plasma display, and/or other display usable in a compute device. The display may include a touchscreen sensor that uses any suitable touchscreen input technology to detect the user's tactile selection of information displayed on the display including, but not limited to, resistive touchscreen sensors, capacitive touchscreen sensors, surface acoustic wave (SAW) touchscreen sensors, infrared touchscreen sensors, optical imaging touchscreen sensors, acoustic touchscreen sensors, and/or other type of touchscreen sensors. Additionally or alternatively, the network device 106 may include one or more peripheral devices 224. Such peripheral devices 224 may include any type of peripheral device commonly found in a compute device such as speakers, a mouse, a keyboard, and/or other input/output devices, interface devices, and/or other peripheral devices.

Figure 3:
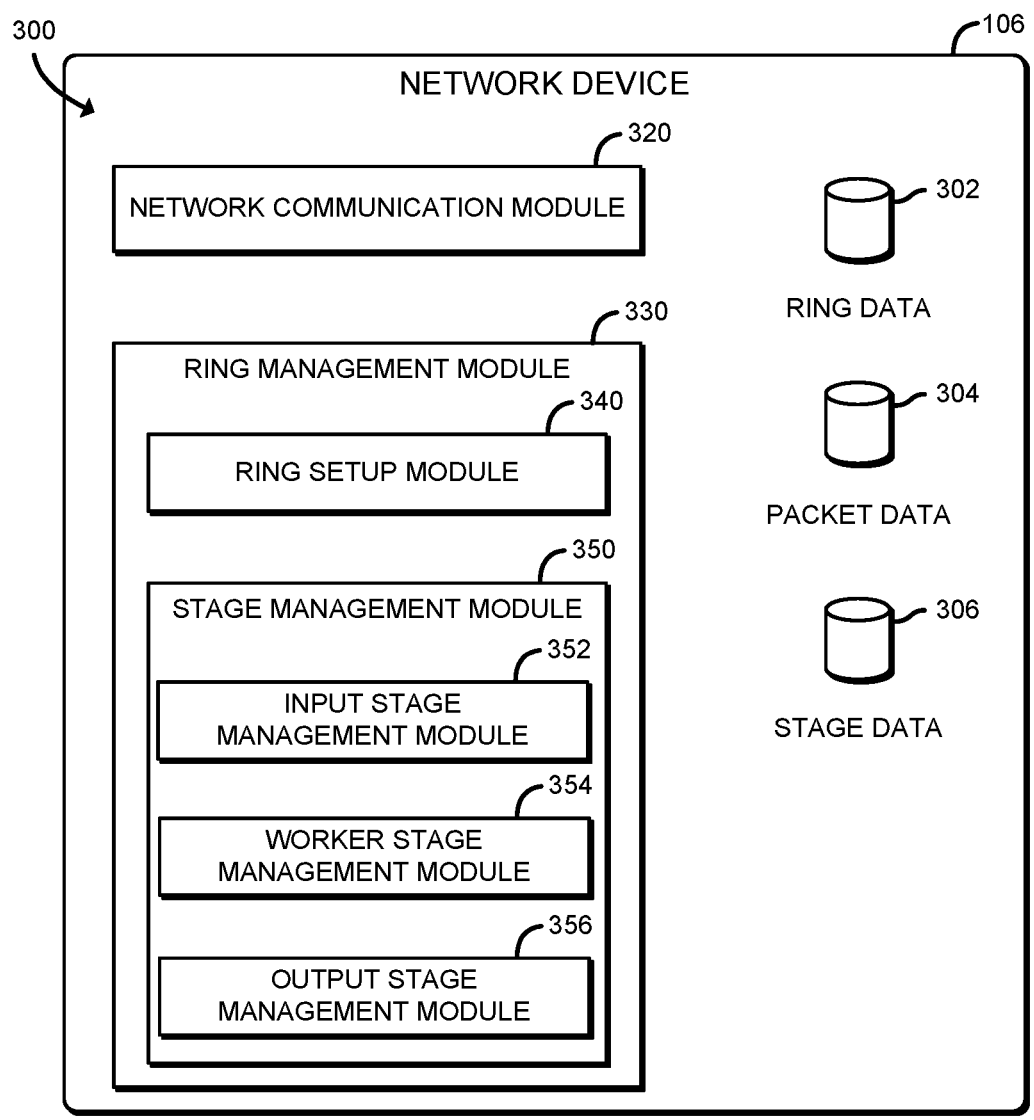
FIG. 3 is a simplified block diagram of at least one embodiment of an environment that may be established by the network device of FIGS. 1 and 2.

Referring now to FIG. 3, in the illustrative embodiment, each network device 106 may establish an environment 300 during operation. The illustrative environment 300 includes a network communication module 320 and a ring management module 330 that includes a ring setup module 340 and a stage management module 350. Each of the modules, logic, and other components of the environment 300 may be embodied as hardware, firmware, software, or a combination thereof. As such, in some embodiments, one or more of the modules of the environment 300 may be embodied as circuitry or collection of electrical devices (e.g., network communication circuitry 320, ring management circuitry 330, ring setup circuitry 340, stage management circuitry 350, etc.). It should be appreciated that, in such embodiments, one or more of the network communication circuitry 320, ring management circuitry 330, ring setup circuitry 340, or stage management circuitry 350 may form a portion of one or more of the CPU 210, main memory 212, I/O subsystem 214, communication circuitry 216 and/or other components of the network device 106. Additionally, in some embodiments, one or more of the illustrative modules may form a portion of another module and/or one or more of the illustrative modules may be independent of one another. Further, in some embodiments, one or more of the modules of the environment 300 may be embodied as virtualized hardware components or emulated architecture, which may be established and maintained by the CPU 210 or other components of the network device 106.

In the illustrative environment 300, the network device 106 also includes ring data 302, packet data 304, and stage data 306. The ring data 302 represents a ring established in the memory 212 and includes a set of entries. As discussed in more detail below in regard to FIG. 8, each entry is associated with a sequence number (i.e., a slot number) and includes a pointer to a data packet and metadata pertaining to the data packet. The metadata defines properties of the data packet, such as the packet size, an input port number, an output port number, and state data that indicates which stages have completed processing of the data packet and whether the data packet is ready for transmission to another device (e.g., to the destination endpoint node 108). The packet data 304, in the illustrative embodiment, is embodied as the contents of the data packets received and operated on by the various stages assigned to the cores 230. As such, the packet data 304 includes headers, payload data, and/or other information initially included in a data packet and/or information added to or modified in the data packet as a result of processing by the stages. The stage data 306, in the illustrative embodiment, includes information used to manage the status of the various stages executed by the cores 230 in the network device 106. As such, the stage data 306 includes a present sequence number (i.e., the index of the present entry in the ring that a given stage is operating on) of each stage and a stage instance identifier, which may be used to distinguish between separate instances of the same stage. The ring data 302, packet data 304, and stage data 306 may be accessed by the various modules and/or sub-modules of the network device 106. It should be appreciated that the network device 106 may include other components, sub-components, modules, sub-modules, and/or devices commonly found in a network device, which are not illustrated in FIG. 3 for clarity of the description.

The network communication module 320, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the network device 106, respectively. To do so, the network communication module 320 is configured to receive and process data packets from one computing device (e.g., the source endpoint node 102, another network device 106, the destination endpoint node 108) and to prepare and send data packets to another computing device (e.g., the source endpoint node 102, another network device 106, the destination endpoint node 108). Accordingly, in some embodiments, at least a portion of the functionality of the network communication module 320 may be performed by the communication circuitry 216, and, in the illustrative embodiment, by the NIC 218.

The ring management module 330, which may be embodied as hardware, firmware, software, virtualized hardware, emulated architecture, and/or a combination thereof as discussed above, is configured to establish the ring in the memory 212 of the network device 106, assign the cores 230 of the CPU 210 to the stages, including an input stage, an output stage, and various worker stages, and manage concurrent access of the stages to entries in the ring. To do so, in the illustrative embodiment, the ring management module 330 includes the ring setup module 340 and the stage management module 350. The ring setup module 340, in the illustrative embodiment, is configured to allocate a section of memory and establish a ring buffer (referred to herein as simply a "ring") in the memory. In the illustrative embodiment, the ring is organized into a series of slots, each of which may contain an entry that includes metadata and a pointer to a data packet, as described above. The slots and, by association, the entries stored therein, have sequence numbers. As described in more detail herein, a process such as a stage may cycle through the entries in the ring by incrementing its own internal sequence number and applying a modulus function to the internal sequence number based on the size (i.e., number of slots) of the ring, such that the resulting sequence number falls into the range of 0 to the size of the ring minus one. In the illustrative embodiment, the ring setup module 340 is configured to establish a ring having a size that is a power of two, which enables the use of masking to convert from a sequence number of a stage to an index (i.e., slot number) into the ring.

The stage management module 350, which may be embodied as hardware, firmware, software, virtualized hardware, emulated architecture, and/or a combination thereof as discussed above, is configured to assign stages to the cores 230 of the CPU 210 and manage their access to the entries in the ring. To do so, the illustrative stage management module includes an input stage management module 352, a worker stage management module 354, and an output stage management module 356. The input stage management module 352, in the illustrative embodiment, is configured to assign a core 230 to the input stage, and use the assigned core 230 to receive data packets from the communication circuitry 216, such as the NIC 218, prepare entries for the ring, based on the received data packets, and add the entries to available slots in the ring. The worker stage management module 354, in the illustrative embodiment, is configured to assign and/or reassign cores 230 to worker stages to identify entries in the ring associated with data packets that are ready to be processed by the worker stages, and use the assigned cores 230 to execute worker functions, such as compression, decompression, encryption, decryption, firewall services, and or other functions on the packet data, and update the metadata to indicate a completion status of each worker stage. The output stage management module 256, in the illustrative embodiment, is configured to assign a core 230 to the output stage, and use the assigned core 230 to iterate through the slots in the ring to identify entries having metadata indicating that the associated data packets are ready for transmission, and provide those data packets to the communication circuitry 216 (e.g., the NIC 218) for transmission to another device, such as the destination endpoint node 108.

It should be appreciated that each of the input stage management module 352, the worker stage management module 354, and the output stage management module 356 may be separately embodied as hardware, firmware, software, virtualized hardware, emulated architecture, and/or a combination thereof. For example, the input stage management module 352 may be embodied as a hardware component, while the worker stage management module 354 and the output stage management module 356 are embodied as virtualized hardware components or as some other combination of hardware, firmware, software, virtualized hardware, emulated architecture, and/or a combination thereof.

Figure 4:
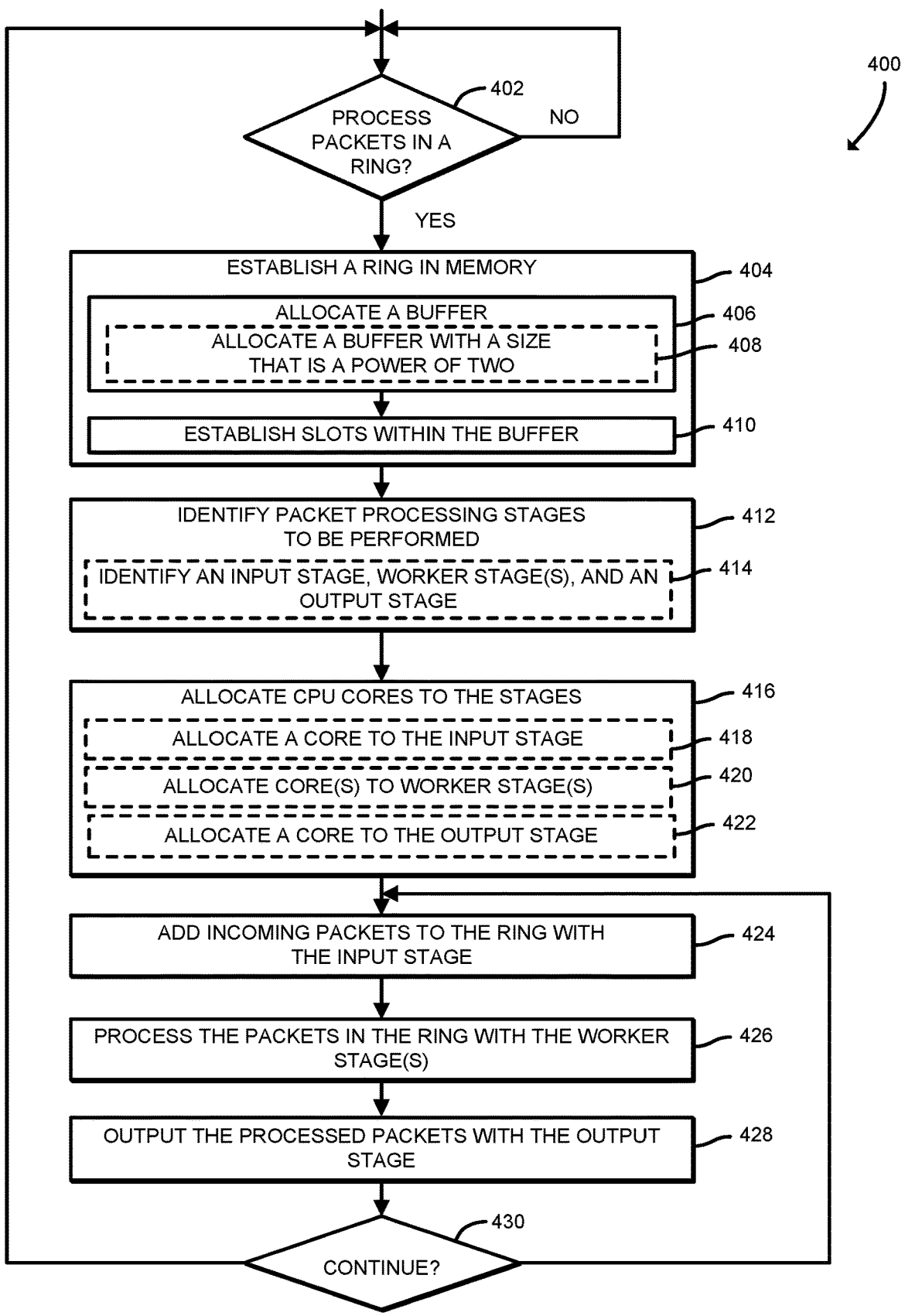
FIG. 4 is a simplified flow diagram of at least one embodiment of a method for coordinating access of stages to data packets that may be performed by the network device of FIGS. 1 and 2.

Referring now to FIG. 4, in use, the network device 106 may execute a method 400 for coordinating access of the stages to data packets. The method 400 begins with block 402, in which the network device 106 determines whether to process data packets in a ring. In the illustrative embodiment, the network device 106 determines whether multiple cores 230 are available for executing different stages of processing (i.e., an input stage, an output stage, and worker stages) and determines to process packets in a ring if the cores 230 are available. Additionally or alternatively, the network device 106 may determine to process packets in a ring based configuration settings, a request provided from another compute device or from a user (e.g., through a graphical user interface), or other factors. Regardless, if the network device 106 determines to process data packets in a ring, the method 402 advances to block 404 in which the network device 106 establishes a ring in memory. In doing so, the network device 106 allocates a buffer in the memory 212, as indicated in block 406. In the illustrative embodiment, the network device 106 allocates a buffer with a size that is a power of two, as indicated in block 408. Doing so enables simple masking to convert from a stage's internal sequence number to an index (i.e., slot number) into the ring. In block 410, the network device 106 establishes slots within the buffer. As described above, each slot has a sequence number (i.e., an index or slot number) and may hold an entry associated with a data packet. In block 412, the network device 106 identifies packet processing stages to be performed. As entries are not removed from the ring, re-ordering is not required and sequence numbers indicate arrival order. The network device 106 may identify the packet processing stages based on an assigned function of the network device 106, defined in configuration settings, one or more applications loaded on the network device 106, or otherwise. For example, some embodiments of the network device 106 may be configured to perform firewall or malware detection services while other embodiments may be configured to perform data encryption or compression services. Yet other embodiments may be configured to perform a combination of these services and/or other services. In identifying the stages, the illustrative network device 106 identifies an input stage, one or more worker stages, and an output stage, as indicated in block 414.

After the stages have been identified, the method 400 advances to block 416 in which the network device 106 allocates cores 230 of the CPU 210 to the stages that were identified. In the illustrative embodiment, the network device 106 allocates a core 230, such as the core 232, to an input stage, as indicated in block 418. As described in more detail herein, the input stage is to receive data packets from the communication circuitry 216 and add entries associated with the received data packets to slots in the ring. Additionally, in the illustrative embodiment, the network device 106 allocates one or more cores 230 to the one or more worker stages, as indicated in block 420. In doing so, the network device 106 may allocate multiple cores 230, such as cores 234, 236 to multiple instances of the same worker stage and/or may allocate different cores 230 to different worker stages. As described in more detail herein, when multiple instances of the same worker stage have been allocated, the illustrative network device 106 employs methods to prevent two or more instances of the same worker stage from attempting to process the data of the same packet, as described in more detail herein. In embodiments with multiple different worker stages, some worker stages may be dependent on the results of other worker stages. For example, a data analysis stage may be dependent on completion of a data decompression stage. In block 422, the illustrative network device 106 allocates a core 230, such as core 238, to the output stage. As described in more detail herein, the output stage is to identify entries in the ring that have metadata indicating that the entry is ready for transmission (i.e., has been processed by the pertinent worker stages), and provide those data packets to the communication circuitry 216 for transmission.

In block 424, the network device 106 adds incoming data packets to the ring with the input stage. Further, in block 426, the network device 106 processes the data packets represented by the entries in the ring with the worker stages. Additionally, in block 428, the network device 106 outputs the processed packets (i.e., provides the processed packets to the communication circuitry 216) with the output stage. While blocks 424, 426, 428 are shown in sequence, in the illustrative embodiment, the allocated cores 230 execute concurrently such that the input stage may be adding data packets to the ring while the worker stages are processing other data packets already in the ring and while the output stage is providing processed data packets to the communication circuitry 216 for transmission. In block 430, the network device 106 determines whether to continue operation of the stages on the data packets. In the illustrative embodiment, the network device 106 may be configured to continue operation of the stages unless an express request to stop is provided, such as a request transmitted from another device, a request from a process or application executing on the network device 106, or a request input from a person through a graphical user interface. If the network device 106 determines to continue, the method 400 loops back to block 424 in which the network device 106 again adds incoming packet to the ring with the input stage. Otherwise, the method 400 loops back to block 402 to determine whether to process packets in a ring.

Figure 5:
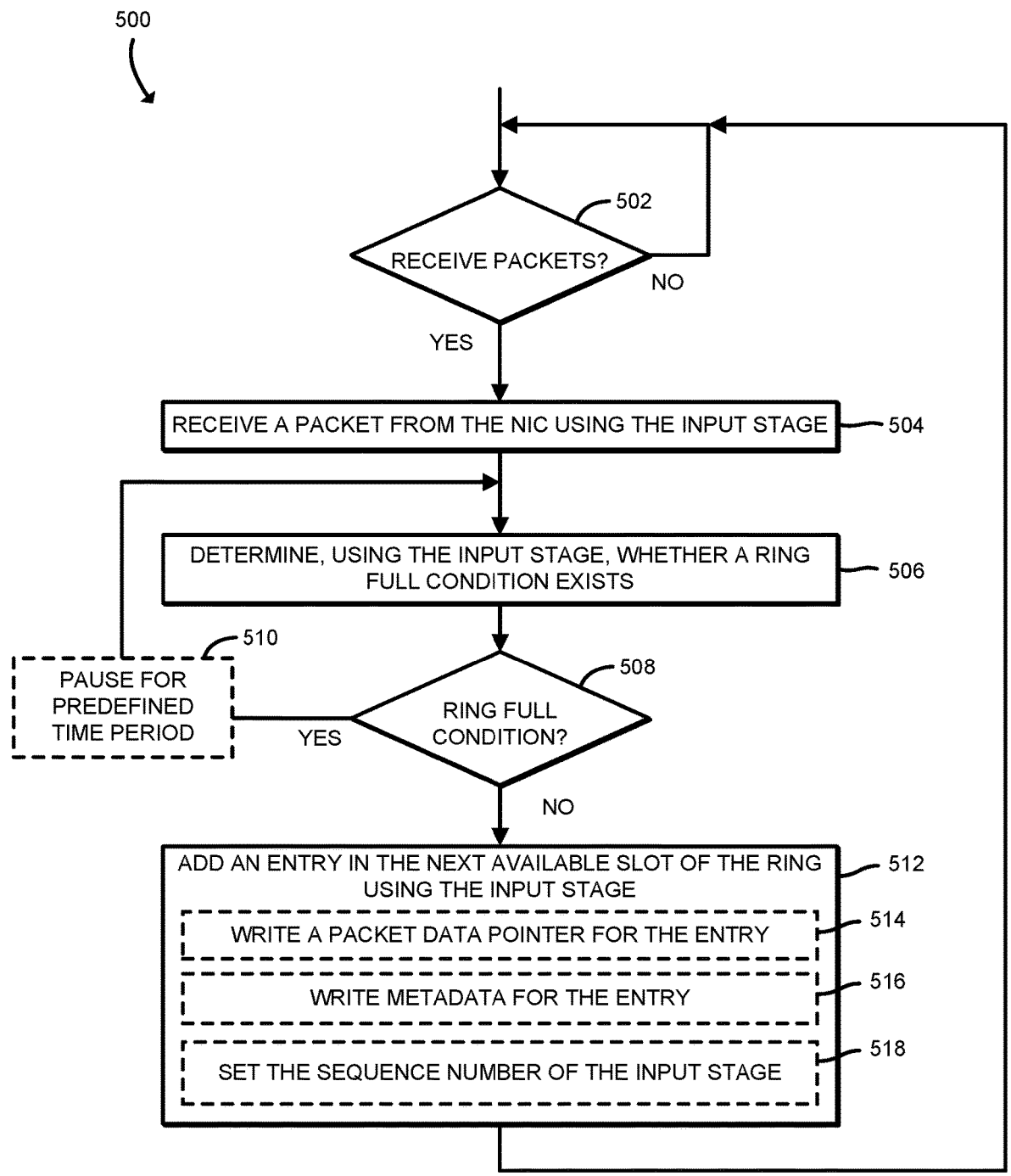
FIG. 5 is a simplified flow diagram of at least one embodiment of a method for receiving data packets by an input stage that may be performed by the network device of FIGS. 1 and 2.

Referring now to FIG. 5, in use, the network device 106 may execute a method 500 for receiving data packets by the input stage. The method 500 corresponds to block 424 of FIG. 4. In the illustrative embodiment, the core 230 allocated to the input stage performs the method 500. The method 500 begins with block 502, in which the network device 106 determines whether to receive data packets. In the illustrative embodiment, the network device 106 determines to receive network packets if the core 230 has been assigned to the input stage and the network device 106 has not received a request from another device, a process or application executed on the network device 106, or a user, to stop receiving packets. In response to a determination to receive data packets, the method 500 advances to block 504 in which the network device 106 receives a data packet from the NIC 218 using the input stage. In block 506, the network device 106 determines, using the input stage, whether a ring full condition exists. A ring full condition may exist when all of the slots in the ring are occupied by entries for data packets that have not yet been processed by the output stage (i.e., they have not yet been provided to the NIC 218 for transmission). In the illustrative embodiment, the network device 106 determines whether a ring full condition is present by determining whether an internal sequence number of the output stage is greater than the internal sequence number of the input stage, minus the size of the ring. If this condition is not satisfied, then a ring full condition is present. In block 508, the network device 106 takes an action based on whether the ring full condition is present. If the network device 106 determines that a ring full condition is present, the network device 106 may pause for a predefined time period (e.g., a predefined number of microseconds), as indicated in block 510, and the method 500 may subsequently loop back to block 506 in which the network device 106 against determines whether a ring full condition is present. In some embodiments, the network device 106 may determine to drop an incoming packet with the input stage if the ring is full. Otherwise, if the network device 106 determines that the ring full condition is not present, the method 500 advances to block 512 in which the network device adds an entry to the next available slot of the ring using the input stage. In the illustrative embodiment, the next available slot is a slot that contains no entry or that contains an entry that may be overwritten because the output stage has already provided the underlying data packet to the NIC 218 (i.e., as indicated by the sequence number of the output stage and/or by metadata written for that entry by the output stage).

In adding an entry in the next available slot of the ring, the illustrative network device 106 writes a packet data pointer for the entry, as indicated in block 514. The packet data pointer specifies the location, in the memory 212, where the data packet is located. Additionally, in the illustrative embodiment, the network device 106 writes metadata for the entry, as indicated in block 516. The metadata defines characteristics of the data packet, such as its size, an input port number, an output port number, one or more fields to be read and/or modified by the various stages, and/or other descriptive data. Further, in the illustrative embodiment, the network device 106 sets (e.g., increments) the sequence number of the input stage. Subsequently, the method 500 loops back to block 502 to again determine whether to receive data packets.

Figure 6:
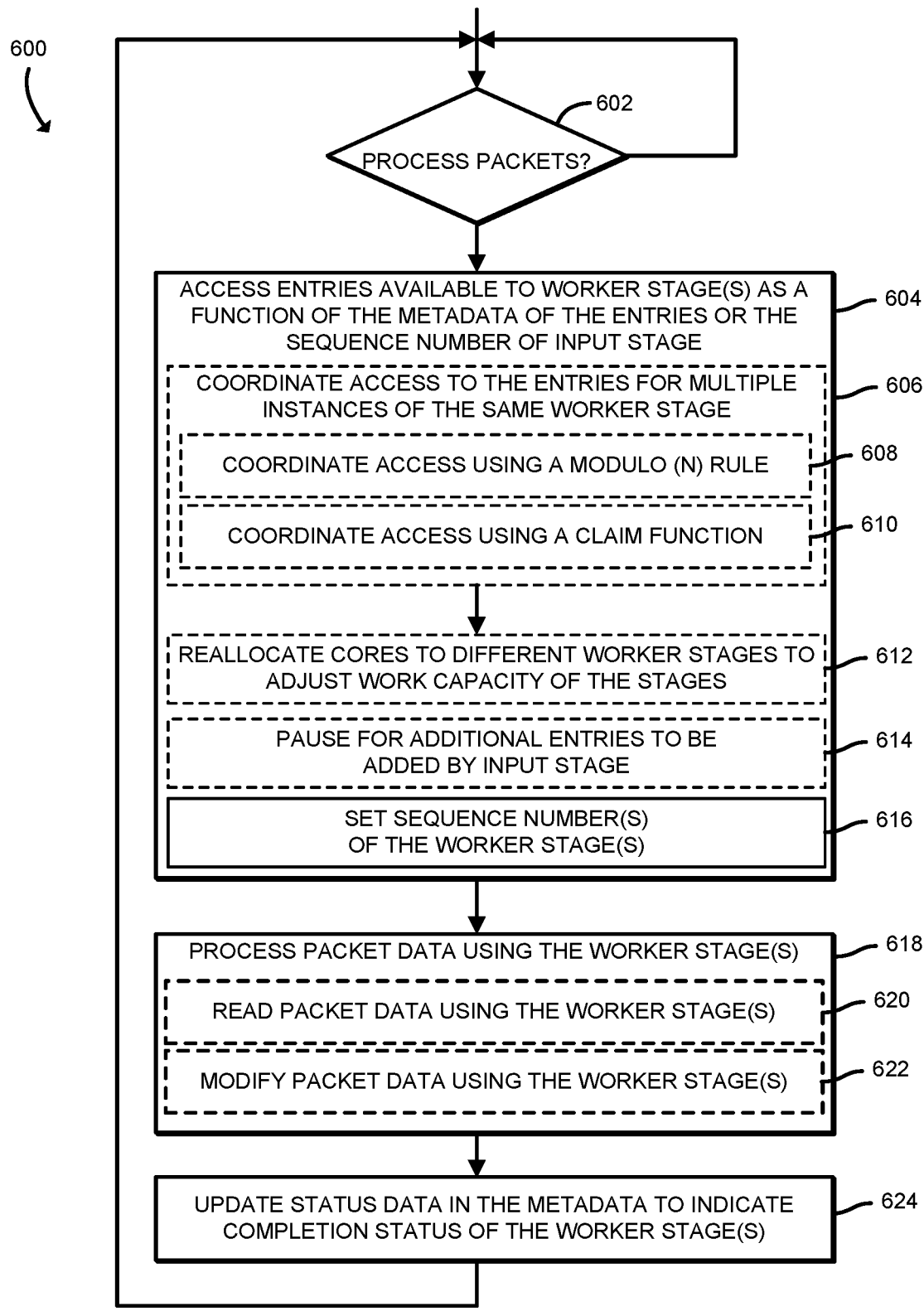
FIG. 6 is a simplified flow diagram of at least one embodiment of a method for processing packets by worker stages that may be performed by the network device of FIGS. 1 and 2.

Referring now to FIG. 6, in use, the network device 106 may execute a method 600 for processing data packets by the worker stages. The method 600 corresponds to block 426 of FIG. 4. In the illustrative embodiment, the cores 230 allocated to the worker stages perform the method 600. The method 600 begins with block 602, in which the network device 106 determines whether to process data packets. In the illustrative embodiment, the network device 106 determines to process data packets if the cores 230 have been allocated to the worker stages and the network device 106 has not received a request from another device, a process or application executed on the network device 106, or a user, to stop processing data packets. In response to a determination to process data packets, the method 600 advances to block 604 in which the worker stages of the network device 106 access entries available to the worker stages as a function of the metadata of the entries in the ring or the sequence number of the input stage. In the illustrative embodiment, the worker stages may read the sequence number of the input stage to determine if there are new packet entries in the ring to be processed. Additionally, in the illustrative embodiment, the metadata of each entry includes one or more status fields to indicate which stages have already operated on or are operating on the entry. The worker stages may read the metadata of the next entry in the ring to determine if the status indicated in the metadata indicates that the entry is ready to be processed by one or more of the worker stages.

As indicated in block 606, the network device 106 may coordinate access to the entries for multiple instances of the same stage. For example, there may be multiple instances of a decompression stage that are to operate on the data packets before another stage is to modify the decompressed data. To coordinate the access to the entries for the multiple instances of the same stage, the network device 106 may coordinate the access using a modulo (N) rule, as indicated in block 608. In the illustrative embodiment, each instance of the same stage follows a rule that it only processes an entry when the sequence number of the instance of that stage, modulo the number of instances of the stage, is equal to a stage instance identifier assigned to that instance of the stage. As indicated in block 610, the network device 106 may coordinate access of the multiple instances of the same stage to the entries in the ring using a claim function. In the claim function, each instance of a stage maintains a FIFO (first in first out) queue of (head, tail) tuples. A stage instance claims exclusive ownership of an entry, or range of entries, using compare and swap (CAS) instructions, and adds the claimed range to its (head, tail) tuple queue. When finished processing, the stage instance attempts to update a shared sequence. This process is described in more detail with reference to FIGS. 10-12.

It should be understood that, embodiments contemplated herein include use of (1) only modulo rules, (2) only claim functions or (3) a mixture of both to implement a pipeline. Parallel operation of stages, on packets is made possible by worker stages complying with rules which allow only specific instances of worker stages to operate on packets. The cooperation between the worker stages using rules such as modulo, avoids the need for locks being used. The shared ring is used to exchange information, while the rules are used to coordinate access to the packets avoiding locking. Other rules that could be used to coordinate access can be based on metadata. These rules can be called metadata rules. Examples of metadata rules include (1) a worker stage only operates on packets with specific header information such as an IP address range, (2) a worker stage only operates on packets in which the header or payload hashes to a specific range, (3) a worker stage operates on a specific class of service field contained in the packet, or (4) a worker stage only operates on a specific combination of fields such as protocol type and class of service As indicated in block 612, the network device 106 may reallocate the cores 230 to different worker stages to adjust the work capacity of the stages. In the illustrative embodiment, if a disproportionate amount (e.g., more than a predefined ratio) of the entries in the ring have not yet been operated on by a particular stage (i.e., as indicated by the metadata of the entries) from which other stages depend, the network device 106 may reallocate a portion of the cores 230 to instances of that particular stage to increase its work capacity. As indicated in block 614, the worker stages may pause momentarily to wait for the input stage to add new entries to the ring if all of the existing entries have been processed by the worker stages. Additionally, as indicated in block 616, the worker stages set (e.g., increment) their respective sequence numbers to iterate to other entries in the ring. While the setting of the sequence numbers is shown after blocks 606 through 614, it should be understood that the sequence number of the worker stages may be set at a different time in the method 600, in other embodiments.

In block 618, the network device 106 processes the packet data using the worker stages. In doing so, the worker stages operate on the data packets associated with the entries that they accessed in block 604. In the illustrative embodiment, in processing the packet data, the network device 106 may read packet data using the worker stages, as indicated in block 620 and/or may modify packet data using the worker stages, as indicated in block 622. As described above, operations performed by the worker stages may include encryption, decryption, compression, decompression, packet data inspection for firewall and/or malware analysis, and/or other functions. In block 624, the network device 106 updates the status data in the metadata of the entries to indicate a completion status of the worker stages. By doing so, worker stages for earlier functions of a pipeline may indicate their completion so that worker stages for later functions of the pipeline, or the output stage, may operate on those data packets. Subsequently, the method 600 loops back to block 602 to determine again whether to process data packets.

Figure 7:
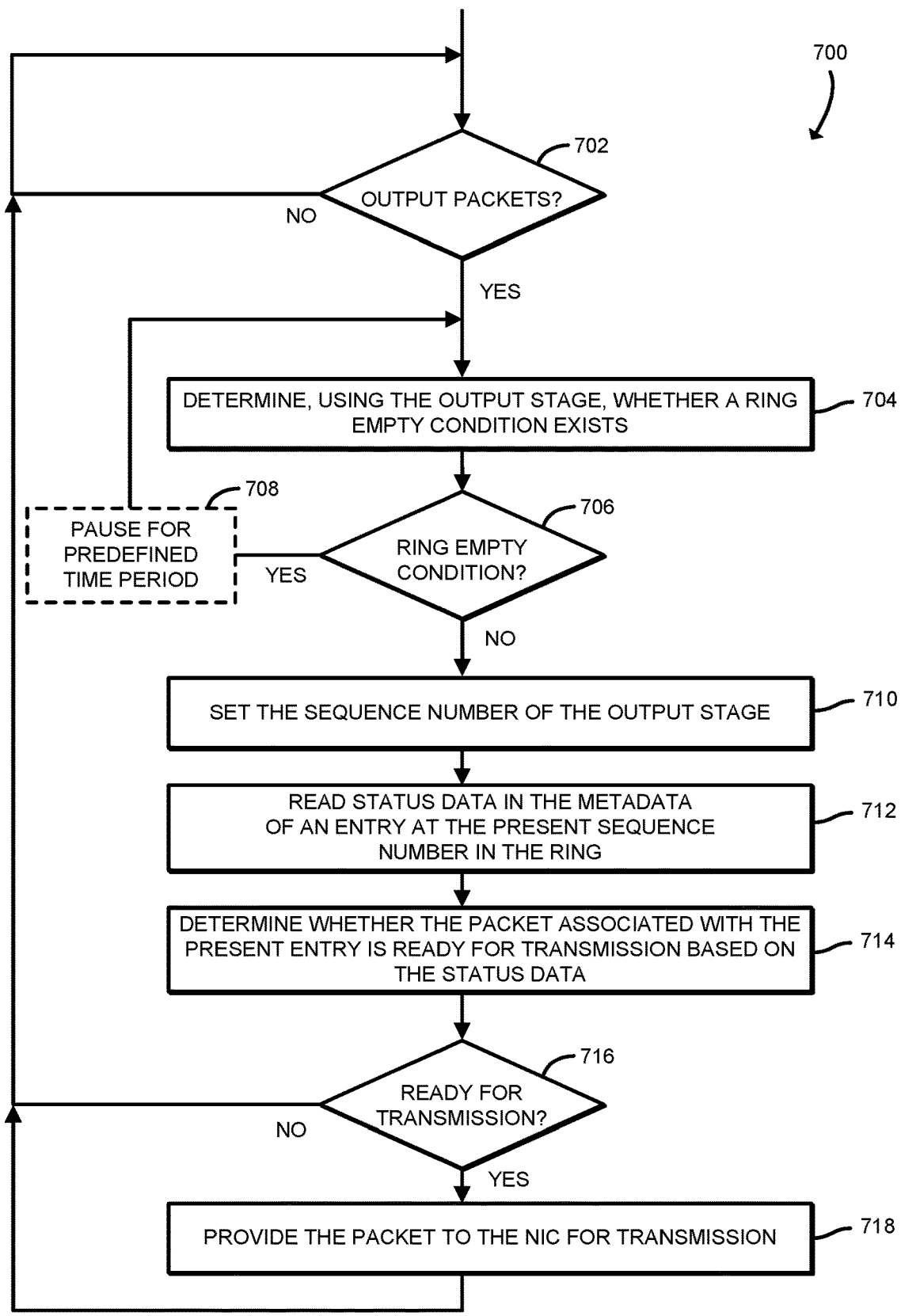
FIG. 7 is a simplified flow diagram of at least one embodiment of a method for outputting packets by an output stage that may be performed by the network device of FIGS. 1 and 2.

Referring now to FIG. 7, in use, the network device 106 may execute a method 700 for outputting data packets by the output stage. The method 700 corresponds to block 428 of FIG. 4. In the illustrative embodiment, the core 230 allocated to the output stage performs the method 700. The method 700 begins with block 702, in which the network device 106 determines whether to output data packets. In the illustrative embodiment, the network device 106 determines to output data packets if the core 230 has been allocated to the output stage and the network device 106 has not received a request from another device, a process or application executed on the network device 106, or a user, to stop outputting data packets. In response to a determination to output data packets, the method 700 advances to block 704 in which the network device 106 determines, using the output stage, whether a ring empty condition exists. A ring empty condition may exist if there are no entries in the ring that are ready to be provided to the NIC 218. The network device 106 may determine whether a ring empty condition is present by reading the sequence number of the input stage, and determining whether the sequence number of the input stage is greater than the sequence number of the output stage. If this condition is not satisfied, then, in the illustrative embodiment, the network device 106 determines that a ring empty condition is present. In block 706, the network device 106 takes an action depending on whether a ring empty condition has been determined to exist. In response to a determination that a ring empty condition is present, the method 700 may advance to block 708, in which the network device 106 pauses for a predefined time period to allow the input stage to add additional entries to the ring, potentially overwriting existing entries that have already been provided to the NIC 218 for transmission. Subsequently, the method 700 loops back to block 704 in which the network device 106 again determines whether a ring empty condition exists. Otherwise, if the network device 106 determines at block 706 that a ring empty condition is not present, the method 700 advances to block 710 in which the network device 106 sets (e.g., increments) the sequence number of the output stage. While the setting of the sequence number is shown as block 710, it should be understood that, in other embodiments, the sequence number of the output stage may be set at a different time in the method 700.

In block 712, the network device 106 reads status data in the metadata of an entry located at the present sequence number (i.e., the sequence number of the output stage) in the ring. In block 714, the network device 106 determines whether the data packet associated with the present entry (i.e., the entry at the sequence number of the output stage) is ready for transmission based on the status data. In the illustrative embodiment, the network device 106 may determine that the data packet is ready for transmission because each worker stage that was to operate on the data packet wrote a status indicator of "complete" or some other indication that those worker stages completed their operation on the data packet, or the final worker stage that operated on the data packet wrote a status indicator of "ready for transmission" or another indication that all of the applicable worker stages have completed their work on the data packet. In block 716, the network device 106 takes an action depending on whether the data packet associated with the present entry is ready for transmission. In response to a determination that the data packet is not ready for transmission, the method 700 loops back to block 702 in which the network device 106 again determines whether to output data packets. Otherwise, the method 700 advances to block 718, in which the network device 106, using the output stage, provides the data packet associated with the present entry to the NIC 218 for transmission. In some embodiments, the output stage may update the metadata of the entry to indicate that the data packet was provided to the NIC 218.

Figure 8:
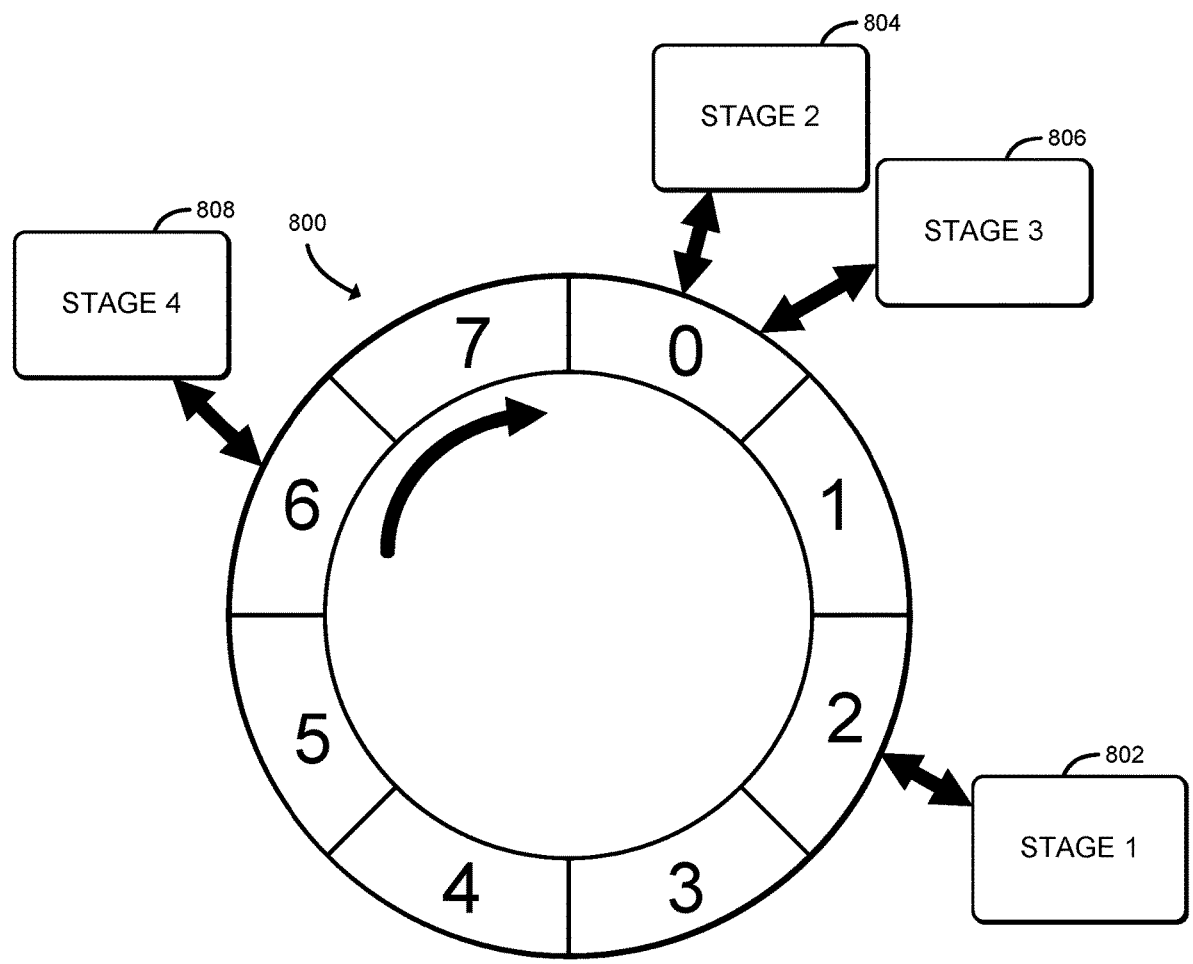
FIG. 8 is a simplified diagram of a ring that may be established in memory by the network device of FIGS. 1 and 2 to coordinate access of the stages to data packets.

Referring now to FIG. 8, an illustrative embodiment of the ring 800 includes eight slots in which entries may be stored. An input stage 802, a worker stage 804, another worker stage 806, and an output stage 808 cycle through the entries in the slots by incrementing their internal sequence numbers. As described above, the sequence numbers of the stages are provided to a modulo function that is based on the size of the ring (i.e., the number of slots), such that the resulting index into the ring cycles back to zero after reaching the number of slots in the ring minus one. Rather than locking a data packet for use by a single stage, multiple stages may access the same entry and certain fields of the metadata may be owned by different stages. As described above, the metadata stored in association with each entry provides status information to the stages to prevent one stage from modifying a portion of data packet before another stage has completed its operations on the data packet.

Figure 9:
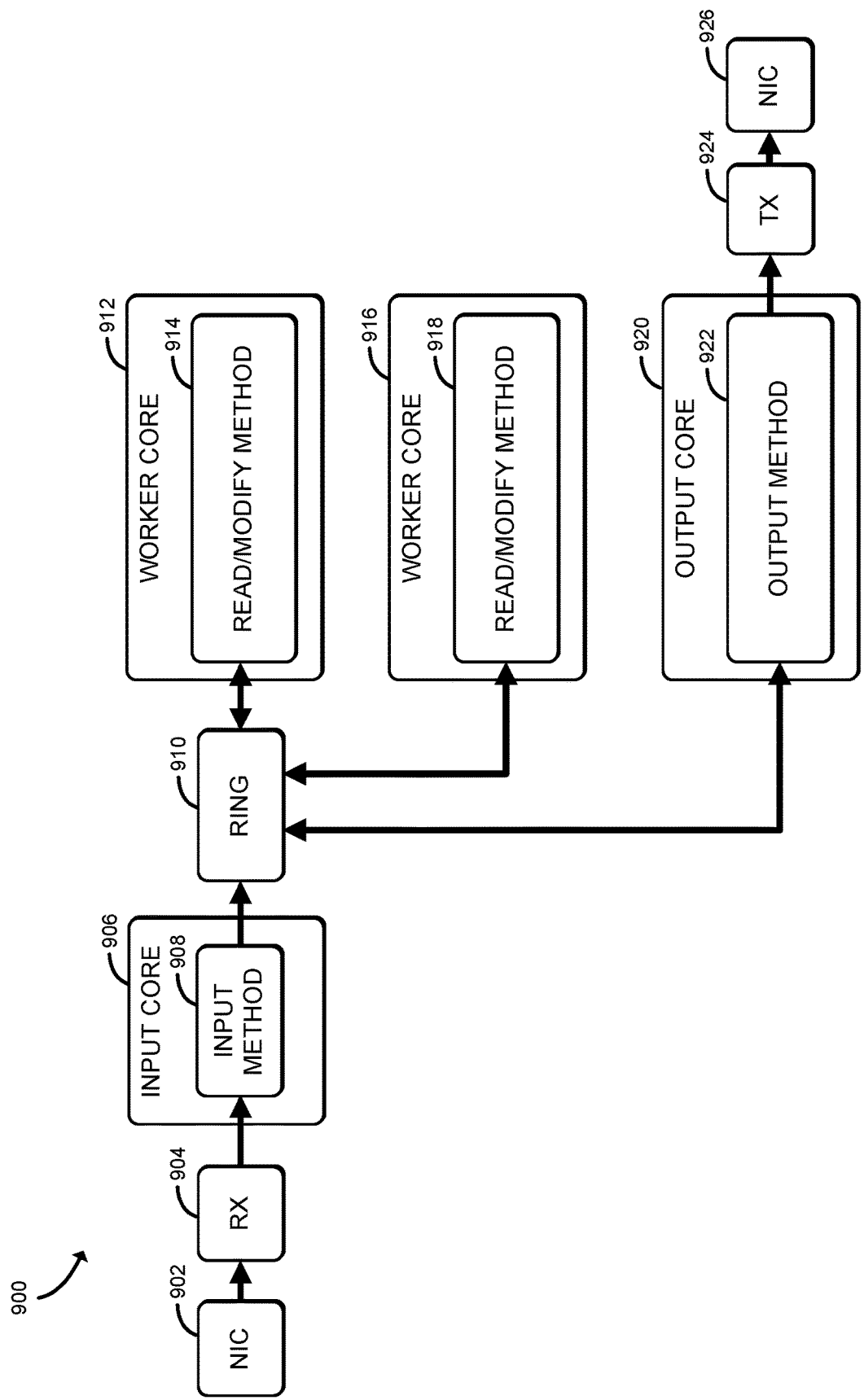
FIG. 9 is a simplified diagram of the access and modification of packet data by multiple cores of the network device of FIGS. 1 and 2.

Referring now to FIG. 9, a diagram 900 represents the manner in which different components of the network device 106 and stages access and operate on data packets using a ring. Initially, the NIC 218 receives a data packet, as indicated in block 902. The data packet is transmitted through a receive line 904 to an input core 906 (i.e., a core 230 allocated to the input stage). The input core 906 executes an input method 908, similar to the method 500 described with reference to FIG. 5, to add entries corresponding to the received packets to a ring 910, which is similar to the ring 800 of FIG. 8. A worker core 912 (i.e., a core 230 allocated to a worker stage) executes a method 914 (a "worker function") to read and/or modify data packets. As described above, each entry in the ring 910 includes a pointer to the corresponding data packet, for use by the worker stages and the output stage. Another worker core 916 (i.e., another core 230 allocated to a worker stage) also executes a method 918 (a "worker function") to read and/or modify data packets. In accessing the ring 910, the worker cores 912, 916 execute a method similar to method 600 of FIG. 6. Additionally, an output core 920 (i.e., a core 230 allocated to the output stage) executes an output method 922 that is similar to the method 700 of FIG. 7. In doing so, the output core identifies entries for data packets that are ready to be transmitted, and provides those data packets to a transmission line, as indicated by block 924, to the NIC 218 for transmission out of the network device 106, as indicated by block 926.

Figure 10:
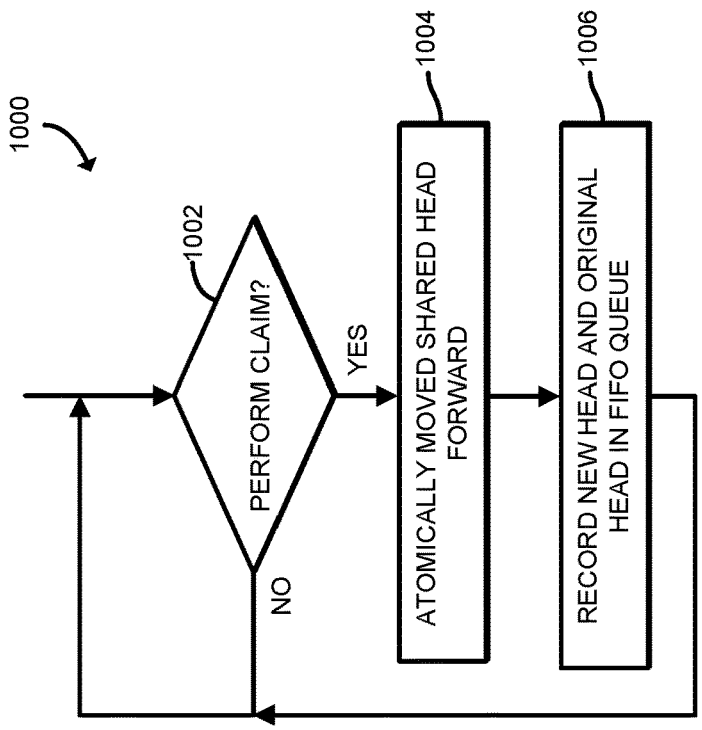
FIG. 10 is a simplified flow diagram of at least one embodiment of a method for claiming an entry in the ring that may be performed by the network device of FIGS. 1 and 2.

Referring now to FIG. 10, in use, the network device 106 may execute a method 1000 to claim (i.e., select) entries in the ring for use by a worker core. The method 1000 corresponds to block 610 of FIG. 6. The method 1000 begins with block 1002, in which the network device 106 determines whether to claim of one or more entries in the ring for a stage. In the illustrative embodiment, the network device 106 may determine to claim any entry if a core 230 has been allocated to a worker stage and the network device 106 is not configured to instead use the modulo function to coordinate access of various worker stages to ring entries. In other embodiments, the network device 106 may determine to claim an entry based on other factors. Regardless, in response to a determination to perform a claim, the method 1000 advances to block 1004 in which the illustrative network device 106 atomically moves a shared head forward. Subsequently, in block 1006, the network device 106 records the new head and the original head in a FIFO queue. Afterwards, the method 1000 loops back to block 1002 to again determine whether to perform a claim.

Figure 11:
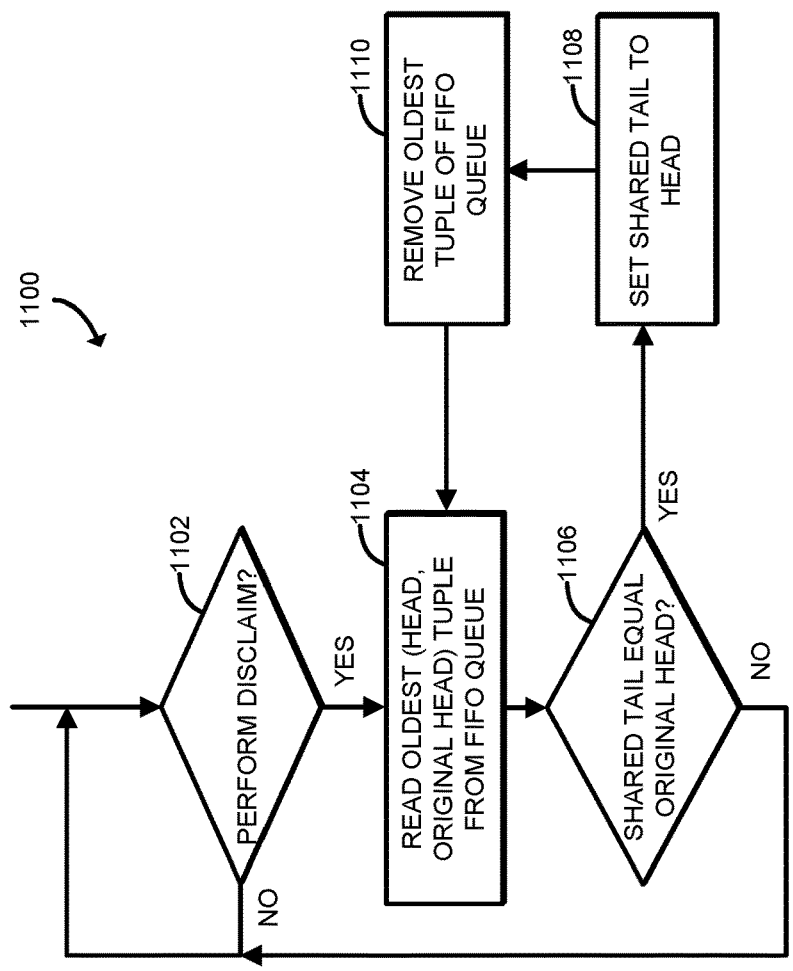
FIG. 11 is a simplified flow diagram of at least one embodiment of a method for disclaiming an entry in the ring that may be performed by the network device of FIGS. 1 and 2.

Referring now to FIG. 11, in use, the network device 106 may execute a method 1100 to disclaim (i.e., deselect) one or more entries. The method 1100 begins with block 1102, in which the network device 106 determines whether disclaim of one or more entries for a stage. The network device 106 may determine to disclaim one or more entries if a core 230 has been allocated to a worker stage, the network device 106 is not configured to use the modulo function to coordinate access of various worker stages, and the network device 106 has previously executed the claim method 1000 for one or more of the entries. In other embodiments, the network device 106 may determine whether to disclaim one or more entries based on other factors. Regardless, in response to a determination to disclaim one or more entries, the method 1100 advances to block 1104, in which the network device 106 reads the oldest (head, original head) tuple from the FIFO queue. In block 1106, the network device 106 determines whether the shared tail is equal to the original head. If not, the method 1100 loops back to block 1102 to again determine whether to disclaim one or more entries. Otherwise, the method 1100 advances to block 1108 in which the network device 106 sets the shared tail to the head. In block 1110, the network device 106 removes the oldest tuple of the FIFO queue and loops back to block 1104, in which the network device 106 again reads the oldest (head, original head) tuple from the FIFO queue.

Figure 12:
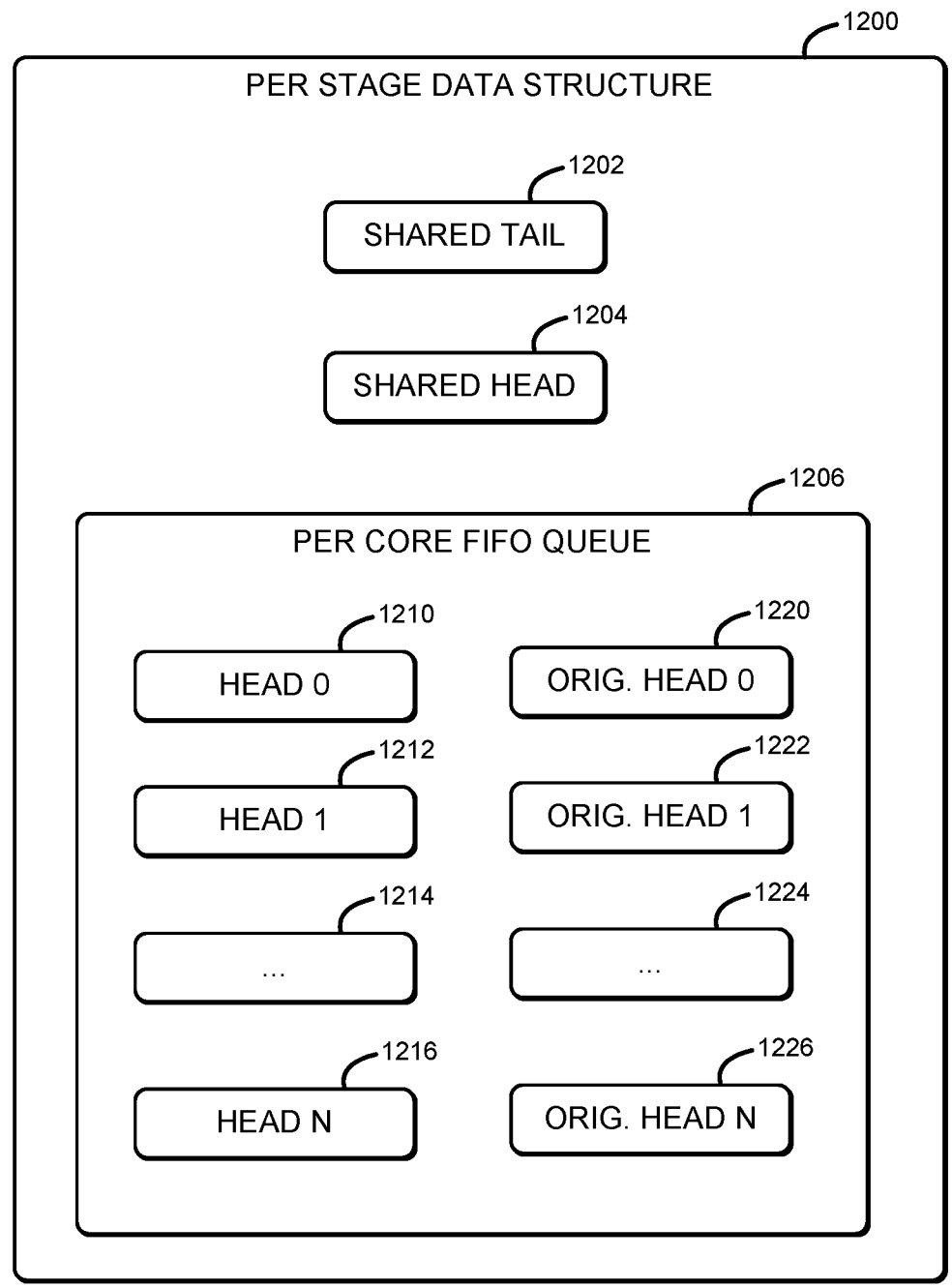
FIG. 12 is a simplified diagram of a per stage data structure including a first in first out (FIFO) queue for each core of each stage, that may be used by the network device of FIGS. 1 and 2.

Referring now to FIG. 12, in use, the network device 106 may utilize a data structure 1200 for each stage. The data structure includes a shared tail 1202 and a shared head 1204. Further, for each core 230 for each stage (i.e., per core, per stage), the network device 106 maintains a FIFO queue 1206. The FIFO queue 1206 includes a set of a head 1210, another head 1212, multiple additional heads 1214, and an Nth head 1216. Additionally, the FIFO queue 1206 includes an original head 1220, another original head 1222, multiple other original heads 1224, and an Nth original head 1226. These data structures may be used by the cores 230 and stages when accessing and operating on the entries in the ring and in performing the claim method 1000 and disclaim method 1100 described above with reference to FIGS. 10 and 11.

EXAMPLES

Illustrative examples of the technologies disclosed herein are provided below. An embodiment of the technologies may include any one or more, and any combination of, the examples described below.

Example 1 includes a network device to process packets, the network device comprising one or more processors that include a plurality of cores; a network interface controller coupled to the one or more processors; and one or more memory devices having stored therein a plurality of instructions that, when executed by the one or more processors, cause the network device to establish a ring in a memory of the one or more memory devices, wherein the ring includes a plurality of slots; allocate at least one core of the plurality of cores to each of an input stage, an output stage, and a worker stage, wherein the worker stage is to process data in a packet with an associated worker function; add, with the input stage, an entry to a slot in the ring representative of a packet received with the network interface controller; access, with the worker stage, the entry in the ring to process at least a portion of the packet; and provide, with the output stage, the processed packet to the network interface controller for transmission.

Example 2 includes the subject matter of Example 1, and wherein to allocate at least one core to a worker stage comprises to allocate multiple cores of the plurality of cores to a plurality of different worker stages associated with different worker functions.

Example 3 includes the subject matter of any of Examples 1 and 2, and wherein to allocate at least one core to a worker stage comprises to allocate multiple cores of the plurality of cores to multiple instances of the same worker stage.

Example 4 includes the subject matter of any of Examples 1-3, and wherein the plurality of instructions, when executed by the one or more processors, further cause the network device to coordinate, with a modulo function, access of the multiple instances of the same worker stage to entries in the ring.

Example 5 includes the subject matter of any of Examples 1-4, and wherein the plurality of instructions, when executed by the one or more processors, further cause the network device to execute a claim function to assign different entries in the ring to respective queues of the multiple instances of the same worker stage.

Example 6 includes the subject matter of any of Examples 1-5, and wherein the plurality of instructions, when executed by the one or more processors, further cause the network device to reallocate the plurality of cores to different worker stages to adjust a work capacity of the different worker stages.

Example 7 includes the subject matter of any of Examples 1-6, and wherein to add an entry representative of the received packet to a slot in the ring comprises to generate, with the input stage, metadata associated with the received packet, wherein the metadata defines at least one of a port or a size of the packet; and add the metadata to the entry.

Example 8 includes the subject matter of any of Examples 1-7, and wherein to add an entry representative of the received packet to a slot in the ring comprises to add a pointer to the packet to the entry.

Example 9 includes the subject matter of any of Examples 1-8, and wherein to access, with the worker stage, the entry in the ring comprises to read status data in metadata stored in the entry; and determine whether the entry is eligible to be processed by the worker stage based on the read status data.

Example 10 includes the subject matter of any of Examples 1-9, and wherein the plurality of instructions, when executed by the one or more processors, further cause the network device to process, in response to a determination that the entry is eligible to be processed, the packet with the worker stage; and update, with the worker stage, the status data to indicate a completion status of the worker stage.

Example 11 includes the subject matter of any of Examples 1-10, and wherein to process the packet with the worker stage comprises to read data stored in the packet or modify data stored in the packet.

Example 12 includes the subject matter of any of Examples 1-11, and wherein to provide, with the output stage, the processed packet to the network interface controller comprises to read, with the output stage, status data in metadata of the entry associated with the packet; determine, with the output stage, whether the status data indicates that the packet is ready for transmission; and provide, in response to a determination that the status data indicates that the packet is ready for transmission, the packet to the network interface controller for transmission.

Example 13 includes the subject matter of any of Examples 1-12, and wherein the plurality of instructions, when executed by the one or more processors, further cause the network device to determine, with the output stage, whether a ring empty condition is present based on a comparison of a sequence number of the output stage with a sequence number of the input stage; and wherein to read, with the output stage, the status data in the metadata of the entry comprises to read the status data in response to a determination that a ring empty condition is not present.

Example 14 includes the subject matter of any of Examples 1-13, and wherein the plurality of instructions, when executed by the one or more processors, further cause the network device to determine, with the input stage, whether a ring full condition is present based on a comparison of a sequence number of the input stage with a sequence number of the output stage; and wherein to add the entry representative of the received packet comprises to add the entry to the ring in response to a determination that the ring full condition is not present.

Example 15 includes the subject matter of any of Examples 1-14, and wherein to establish a ring in a memory of the one or more memory devices comprises to establish a ring that has a size that is a power of two.

Example 16 includes a method for processing packets, comprising establishing, by a network device, a ring in a memory of the network device, wherein the ring includes a plurality of slots; allocating, by the network device, at least one core of a plurality of cores of one or more processors of the network device, to each of an input stage, an output stage, and a worker stage, wherein the worker stage is to process data in a packet with an associated worker function; adding, with the input stage, an entry to a slot in the ring representative of a packet received with a network interface controller of the network device; accessing, with the worker stage, the entry in the ring to process at least a portion of the packet; and providing, with the output stage, the processed packet to the network interface controller for transmission.

Example 17 includes the subject matter of Example 16, and wherein allocating at least one core to a worker stage comprises allocating multiple cores of the plurality of cores to a plurality of different worker stages associated with different worker functions.

Example 18 includes the subject matter of any of Examples 16 and 17, and wherein allocating at least one core to a worker stage comprises allocating multiple cores of the plurality of cores to multiple instances of the same worker stage.

Example 19 includes the subject matter of any of Examples 16-18, and further including coordinating, with a modulo function, access of the multiple instances of the same worker stage to entries in the ring.

Example 20 includes the subject matter of any of Examples 16-19, and further including executing a claim function to assign different entries in the ring to respective queues of the multiple instances of the same worker stage.

Example 21 includes the subject matter of any of Examples 16-20, and further including reallocating, by the network device, the plurality of cores to different worker stages to adjust a work capacity of the different worker stages.

Example 22 includes the subject matter of any of Examples 16-21, and wherein adding an entry representative of the received packet to a slot in the ring comprises generating, with the input stage, metadata associated with the received packet, wherein the metadata defines at least one of a port or a size of the packet; and adding the metadata to the entry.

Example 23 includes the subject matter of any of Examples 16-22, and wherein adding an entry representative of the received packet to a slot in the ring comprises adding a pointer to the packet to the entry.

Example 24 includes the subject matter of any of Examples 16-23, and wherein accessing, with the worker stage, the entry in the ring comprises reading status data in metadata stored in the entry; and determining whether the entry is eligible to be processed by the worker stage based on the read status data.

Example 25 includes the subject matter of any of Examples 16-24, and further including processing, in response to a determination that the entry is eligible to be processed, the packet with the worker stage; and updating, with the worker stage, the status data to indicate a completion status of the worker stage.

Example 26 includes the subject matter of any of Examples 16-25, and wherein processing the packet with the worker stage comprises at least one of reading, by the network device, data stored in the packet or modifying, by the network device, data stored in the packet.

Example 27 includes the subject matter of any of Examples 16-26, and wherein providing, with the output stage, the processed packet to the network interface controller comprises reading, with the output stage, status data in metadata of the entry associated with the packet; determining, with the output stage, whether the status data indicates that the packet is ready for transmission; and providing, in response to a determination that the status data indicates that the packet is ready for transmission, the packet to the network interface controller for transmission.

Example 28 includes the subject matter of any of Examples 16-27, and further including determining, with the output stage, whether a ring empty condition is present based on a comparison of a sequence number of the output stage with a sequence number of the input stage; and wherein reading, with the output stage, the status data in the metadata of the entry comprises reading the status data in response to a determination that a ring empty condition is not present.

Example 29 includes the subject matter of any of Examples 16-28, and further including determining, with the input stage, whether a ring full condition is present based on a comparison of a sequence number of the input stage with a sequence number of the output stage; and wherein adding the entry representative of the received packet comprises adding the entry to the ring in response to a determination that the ring full condition is not present.

Example 30 includes the subject matter of any of Examples 16-29, and wherein establishing a ring in a memory of the one or more memory devices comprises establishing a ring that has a size that is a power of two.

Example 31 includes a network device comprising one or more processors; and a memory having stored therein a plurality of instructions that when executed by the one or more processors cause the network device to perform the method of any of claims 16-30.

Example 32 includes one or more machine readable storage media comprising a plurality of instructions stored thereon that in response to being executed result in a network device performing the method of any of Examples 16-30.

Example 33 includes a network device to process packets, the network device comprising one or more processors that include a plurality of cores; a network interface controller coupled to the one or more processors; and ring management circuitry to (i) establish a ring in a memory of the one or more memory devices, wherein the ring includes a plurality of slots; (ii) allocate at least one core of the plurality of cores to each of an input stage, an output stage, and a worker stage, wherein the worker stage is to process data in a packet with an associated worker function; (iii) add, with the input stage, an entry to a slot in the ring representative of a packet received with the network interface controller; (iv) access, with the worker stage, the entry in the ring to process at least a portion of the packet; and (v) provide, with the output stage, the processed packet to the network interface controller for transmission.

Example 34 includes the subject matter of Example 33, and wherein to allocate at least one core to a worker stage comprises to allocate multiple cores of the plurality of cores to a plurality of different worker stages associated with different worker functions.

Example 35 includes the subject matter of any of Examples 32 and 34, and wherein to allocate at least one core to a worker stage comprises to allocate multiple cores of the plurality of cores to multiple instances of the same worker stage.

Example 36 includes the subject matter of any of Examples 32-35, and wherein the ring management circuitry is further to coordinate, with a modulo function, access of the multiple instances of the same worker stage to entries in the ring.

Example 37 includes the subject matter of any of Examples 32-36, and wherein the ring management circuitry is further to execute a claim function to assign different entries in the ring to respective queues of the multiple instances of the same worker stage.

Example 38 includes the subject matter of any of Examples 32-37, and wherein the ring management circuitry is further to reallocate the plurality of cores to different worker stages to adjust a work capacity of the different worker stages.

Example 39 includes the subject matter of any of Examples 32-38, and wherein to add an entry representative of the received packet to a slot in the ring comprises to generate, with the input stage, metadata associated with the received packet, wherein the metadata defines at least one of a port or a size of the packet; and add the metadata to the entry.

Example 40 includes the subject matter of any of Examples 32-39, and wherein to add an entry representative of the received packet to a slot in the ring comprises to add a pointer to the packet to the entry.

Example 41 includes the subject matter of any of Examples 32-40, and wherein to access, with the worker stage, the entry in the ring comprises to read status data in metadata stored in the entry; and determine whether the entry is eligible to be processed by the worker stage based on the read status data.

Example 42 includes the subject matter of any of Examples 32-41, and wherein the ring management circuitry is further to process, in response to a determination that the entry is eligible to be processed, the packet with the worker stage; and update, with the worker stage, the status data to indicate a completion status of the worker stage.

Example 43 includes the subject matter of any of Examples 32-42, and wherein to process the packet with the worker stage comprises to read data stored in the packet or modify data stored in the packet.

Example 44 includes the subject matter of any of Examples 32-43, and wherein to provide, with the output stage, the processed packet to the network interface controller comprises to read, with the output stage, status data in metadata of the entry associated with the packet; determine, with the output stage, whether the status data indicates that the packet is ready for transmission; and provide, in response to a determination that the status data indicates that the packet is ready for transmission, the packet to the network interface controller for transmission.

Example 45 includes the subject matter of any of Examples 32-44, and wherein the ring management circuitry is further to determine, with the output stage, whether a ring empty condition is present based on a comparison of a sequence number of the output stage with a sequence number of the input stage; and wherein to read, with the output stage, the status data in the metadata of the entry comprises to read the status data in response to a determination that a ring empty condition is not present.

Example 46 includes the subject matter of any of Examples 32-45, and wherein the ring management circuitry is further to determine, with the input stage, whether a ring full condition is present based on a comparison of a sequence number of the input stage with a sequence number of the output stage; and wherein to add the entry representative of the received packet comprises to add the entry to the ring in response to a determination that the ring full condition is not present.

Example 47 includes the subject matter of any of Examples 32-46, and wherein to establish a ring in a memory of the one or more memory devices comprises to establish a ring that has a size that is a power of two.

Example 48 includes a network device to process packets, the network device comprising means for establishing a ring in a memory of the network device, wherein the ring includes a plurality of slots; means for allocating at least one core of a plurality of cores of one or more processors of the network device, to each of an input stage, an output stage, and a worker stage, wherein the worker stage is to process data in a packet with an associated worker function; means for adding, with the input stage, an entry to a slot in the ring representative of a packet received with a network interface controller of the network device; means for accessing, with the worker stage, the entry in the ring to process at least a portion of the packet; and network communication circuitry for providing, with the output stage, the processed packet to the network interface controller for transmission.

Example 49 includes the subject matter of Example 48, and wherein the means for allocating at least one core to a worker stage comprises means for allocating multiple cores of the plurality of cores to a plurality of different worker stages associated with different worker functions.

Example 50 includes the subject matter of any of Examples 48 and 49, and wherein the means for allocating at least one core to a worker stage comprises means for allocating multiple cores of the plurality of cores to multiple instances of the same worker stage.

Example 51 includes the subject matter of any of Examples 48-50, and further including means for coordinating, with a modulo function, access of the multiple instances of the same worker stage to entries in the ring.

Example 52 includes the subject matter of any of Examples 48-51, and further including means for executing a claim function to assign different entries in the ring to respective queues of the multiple instances of the same worker stage.

Example 53 includes the subject matter of any of Examples 48-52, and further including means for reallocating the plurality of cores to different worker stages to adjust a work capacity of the different worker stages.

Example 54 includes the subject matter of any of Examples 48-53, and wherein the means for adding an entry representative of the received packet to a slot in the ring comprises means for generating, with the input stage, metadata associated with the received packet, wherein the metadata defines at least one of a port or a size of the packet; and means for adding the metadata to the entry.

Example 55 includes the subject matter of any of Examples 48-54, and wherein the means for adding an entry representative of the received packet to a slot in the ring comprises means for adding a pointer to the packet to the entry.

Example 56 includes the subject matter of any of Examples 48-55, and wherein the means for accessing, with the worker stage, the entry in the ring comprises means for reading status data in metadata stored in the entry; and means for determining whether the entry is eligible to be processed by the worker stage based on the read status data.

Example 57 includes the subject matter of any of Examples 48-56, and further including means for processing, in response to a determination that the entry is eligible to be processed, the packet with the worker stage; and means for updating, with the worker stage, the status data to indicate a completion status of the worker stage.

Example 58 includes the subject matter of any of Examples 48-57, and wherein the means for processing the packet with the worker stage comprises at least one of means for reading data stored in the packet or means for modifying data stored in the packet.

Example 59 includes the subject matter of any of Examples 48-58, and wherein the network communication circuitry for providing, with the output stage, the processed packet to the network interface controller comprises circuitry for reading, with the output stage, status data in metadata of the entry associated with the packet; circuitry for determining, with the output stage, whether the status data indicates that the packet is ready for transmission; and circuitry for providing, in response to a determination that the status data indicates that the packet is ready for transmission, the packet to the network interface controller for transmission.

Example 60 includes the subject matter of any of Examples 48-59, and further including circuitry for determining, with the output stage, whether a ring empty condition is present based on a comparison of a sequence number of the output stage with a sequence number of the input stage; and wherein the circuitry for reading, with the output stage, the status data in the metadata of the entry comprises circuitry for reading the status data in response to a determination that a ring empty condition is not present.

Example 61 includes the subject matter of any of Examples 48-60, and further including means for determining, with the input stage, whether a ring full condition is present based on a comparison of a sequence number of the input stage with a sequence number of the output stage; and wherein the means for adding the entry representative of the received packet comprises means for adding the entry to the ring in response to a determination that the ring full condition is not present.

Example 62 includes the subject matter of any of Examples 48-61, and wherein the means for establishing a ring in a memory of the one or more memory devices comprises means for establishing a ring that has a size that is a power of two.

The invention claimed is:

1. A network device to process packets, the network device comprising:
   one or more processors that include a plurality of cores;
   a network interface controller coupled to the one or more processors; and
   one or more memory devices having stored therein a plurality of instructions that, when executed by the one or more processors, cause the network device to:
      establish a shared ring in a memory of the one or more memory devices, wherein the shared ring includes a plurality of slots;
      allocate at least one core of the plurality of cores to each of a plurality of stages, the plurality of stages including an input stage, an output stage, and a worker stage, wherein the worker stage is to process data in a packet with an associated worker function;
      add, with the input stage, an entry to a slot in the shared ring representative of a packet received with the network interface controller, wherein the entry includes metadata indicative that the packet is ready to be operated on by a worker stage, the plurality of stages can concurrently access a same entry in the shared ring, the metadata stored in association with each entry in the shared ring provides status information to the plurality of stages to prevent one stage from modifying the packet before another stage has completed operations on the packet;
      determine, with the worker stage, from the metadata included in the entry and by reading, from memory with the worker stage, a sequence number of the input stage, indicative of a present index in the shared ring that the input stage is operating on, whether the packet is ready to be operated on by the worker stage;
      access, with the worker stage and in response to a determination that the metadata included in the entry and the sequence number of the input stage indicates that the entry is ready to be operated on, the entry in the shared ring to process at least a portion of the packet; and
      provide, with the output stage, the processed packet to the network interface controller for transmission.

2. The network device of claim 1, wherein to allocate at least one core to a worker stage comprises to allocate multiple cores of the plurality of cores to a plurality of different worker stages associated with different worker functions.

3. The network device of claim 1, wherein to allocate at least one core to a worker stage comprises to allocate multiple cores of the plurality of cores to multiple instances of the same worker stage.

4. The network device of claim 3, wherein the plurality of instructions, when executed by the one or more processors, further cause the network device to coordinate, with a modulo function, access of the multiple instances of the same worker stage to entries in the shared ring.

5. The network device of claim 3, wherein the plurality of instructions, when executed by the one or more processors, further cause the network device to execute a claim function to assign different entries in the shared ring to respective queues of the multiple instances of the same worker stage.

6. The network device of claim 1, wherein the plurality of instructions, when executed by the one or more processors, further cause the network device reallocate the plurality of cores to different worker stages to adjust a work capacity of the different worker stages.

7. The network device of claim 1, wherein to add an entry representative of the received packet to a slot in the shared ring comprises to:
   define, in the metadata, at least one of a port or a size of the packet.

8. The network device of claim 1, wherein to add an entry representative of the received packet to a slot in the shared ring comprises to add a pointer to the packet to the entry.

9. The network device of claim 1, wherein the plurality of instructions, when executed by the one or more processors, further cause the network device to:
   update, with the worker stage, the metadata to indicate a completion status of the worker stage.

10. The network device of claim 9, wherein to process the packet with the worker stage comprises to read data stored in the packet or modify data stored in the packet.

11. The network device of claim 1, wherein to provide, with the output stage, the processed packet to the network interface controller comprises to:
   read, with the output stage, status data in the metadata of the entry associated with the packet;
   determine, with the output stage, whether the status data indicates that the packet is ready for transmission; and
   provide, in response to a determination that the status data indicates that the packet is ready for transmission, the packet to the network interface controller for transmission.

12. One or more non-transitory machine-readable storage media comprising a plurality of instructions stored thereon that in response to being executed, cause a network device to:
   establish a shared ring in a memory of the network device, wherein the shared ring includes a plurality of slots;
   allocate at least one core of a plurality of cores of one or more processors of the network device, to each of a plurality of stages, the plurality of stages including an input stage, an output stage, and a worker stage, wherein the worker stage is to process data in a packet with an associated worker function;
   add, with the input stage, an entry to a slot in the shared ring representative of a packet received with a network interface controller of the network device, wherein the entry includes metadata indicative that the packet is ready to be operated on by a worker stage, the plurality of stages can concurrently access a same entry in the shared ring, the metadata stored in association with each entry in the shared ring provides status information to the plurality of stages to prevent one stage from modifying the packet before another stage has completed operations on the packet;

determine, with the worker stage, from the metadata included in the entry and by reading, from the memory with the worker stage, a sequence number of the input stage, indicative of an index of a present entry in the shared ring that the input stage is operating on, whether the packet is ready to be operated on by the worker stage;

access, with the worker stage and in response to a determination that the metadata included in the entry and the sequence number of the input stage indicates that the entry in the shared ring is ready to be operated on, to process at least a portion of the packet; and provide, with the output stage, the processed packet to the network interface controller for transmission.

13. The one or more non-transitory machine-readable storage media of claim 12, wherein to allocate at least one core to a worker stage comprises to allocate multiple cores of the plurality of cores to a plurality of different worker stages associated with different worker functions.

14. The one or more non-transitory machine-readable storage media of claim 12, wherein to allocate at least one core to a worker stage comprises to allocate multiple cores of the plurality of cores to multiple instances of the same worker stage.

15. The one or more non-transitory machine-readable storage media of claim 14, wherein the plurality of instructions further cause the network device to coordinate, with a modulo function, access of the multiple instances of the same worker stage to entries in the shared ring.

16. The one or more non-transitory machine-readable storage media of claim 14, wherein the plurality of instructions further cause the network device to execute a claim function to assign different entries in the shared ring to respective queues of the multiple instances of the same worker stage.

17. The one or more non-transitory machine-readable storage media of claim 12, wherein the plurality of instructions further cause the network device to reallocate the plurality of cores to different worker stages to adjust a work capacity of the different worker stages.

18. The one or more non-transitory machine-readable storage media of claim 12, wherein to add an entry representative of the received packet to a slot in the shared ring comprises to:
define, in the metadata, at least one of a port or a size of the packet.

19. The one or more non-transitory machine-readable storage media of claim 12, wherein to add an entry representative of the received packet to a slot in the shared ring comprises to add a pointer to the packet to the entry.

20. The one or more non-transitory machine-readable storage media of claim 12, wherein the plurality of instructions further cause the network device to:
update, with the worker stage, the metadata to indicate a completion status of the worker stage.

21. The one or more non-transitory machine-readable storage media of claim 20, wherein to process the packet with the worker stage comprises to read data stored in the packet or modify data stored in the packet.

22. The one or more non-transitory machine-readable storage media of claim 12, wherein to provide, with the output stage, the processed packet to the network interface controller comprises to:
read, with the output stage, status data in the metadata of the entry associated with the packet;
determine, with the output stage, whether the status data indicates that the packet is ready for transmission; and
provide, in response to a determination that the status data indicates that the packet is ready for transmission, the packet to the network interface controller for transmission.

23. A network device to process packets, the network device comprising:
circuitry for establishing a shared ring in a memory of the network device, wherein the shared ring includes a plurality of slots;
circuitry for allocating at least one core of a plurality of cores of one or more processors of the network device, to each of a plurality of stages, the plurality of stages including an input stage, an output stage, and a worker stage, wherein the worker stage is to process data in a packet with an associated worker function;
circuitry for adding, with the input stage, an entry to a slot in the shared ring representative of a packet received with a network interface controller of the network device, wherein the entry includes metadata indicative that the packet is ready to be operated on by a worker stage, the plurality of stages can concurrently access a same entry in the shared ring, the metadata stored in association with each entry in the shared ring provides status information to the plurality of stages to prevent one stage from modifying the packet before another stage has completed operations on the packet;
circuitry for determining, with the worker stage, from the metadata included in the entry and by reading, from memory with the worker stage, a sequence number of the input stage, indicative of a present index in the shared ring that the input stage is operating on, whether the packet is ready to be operated on by the worker stage;
circuitry for accessing, with the worker stage and in response to a determination that the metadata included in the entry and the sequence number of the input stage indicates that the entry is ready to be operated on, the entry in the shared ring to process at least a portion of the packet; and
network communication circuitry for providing, with the output stage, the processed packet to the network interface controller for transmission.

24. A method for processing packets, comprising:
establishing, by a network device, a shared ring in a memory of the network device, wherein the shared ring includes a plurality of slots;
allocating, by the network device, at least one core of a plurality of cores of one or more processors of the network device, to each of a plurality of stages, the plurality of stages including an input stage, an output stage, and a worker stage, wherein the worker stage is to process data in a packet with an associated worker function;
adding, with the input stage, an entry to a slot in the shared ring representative of a packet received with a network interface controller of the network device, wherein the entry includes metadata indicative that the packet is ready to be operated on by a worker stage, the plurality of stages can concurrently access a same entry in the shared ring, the metadata stored in association with each entry in the shared ring provides status information to the plurality of stages to prevent one stage from modifying the packet before another stage has completed operations on the packet;

determining, from the metadata included in the entry and by reading, from memory with the worker stage, a sequence number of the input stage, indicative of a present index in the shared ring that the input stage is operating on, whether the packet is ready to be operated on by the worker stage;

accessing, with the worker stage and in response to a determination that the metadata included in the entry and the sequence number of the input stage indicates that the entry is ready to be operated on, the entry in the shared ring to process at least a portion of the packet; and providing, with the output stage, the processed packet to the network interface controller for transmission.

25. The method of claim 24, wherein allocating at least one core to a worker stage comprises allocating multiple cores of the plurality of cores to a plurality of different worker stages associated with different worker functions.

26. The method of claim 24, wherein allocating at least one core to a worker stage comprises allocating multiple cores of the plurality of cores to multiple instances of the same worker stage.

* * * * *